United States Patent
Subudhi et al.

(10) Patent No.: US 10,628,013 B2
(45) Date of Patent: Apr. 21, 2020

(54) CLOSED-LOOP DISPLAY CONTROL FOR MULTI-DIMENSIONAL USER INTERFACE GENERATION

(71) Applicant: Accenture Global Solutions Limited, Dublin (IE)

(72) Inventors: Chinu Subudhi, Karnataka (IN); Raghavender Jogaraju, Telangana (IN)

(73) Assignee: Accenture Global Solutions Limited, Dublin (IE)

( * ) Notice: Subject to any disclaimer, the term of this patent is extended or adjusted under 35 U.S.C. 154(b) by 173 days.

(21) Appl. No.: 15/693,757

(22) Filed: Sep. 1, 2017

(65) Prior Publication Data
US 2018/0095645 A1  Apr. 5, 2018

(30) Foreign Application Priority Data

Sep. 2, 2016 (IN) .............................. 201641030098
Jul. 28, 2017 (IN) ............................. 2016/41030098

(51) Int. Cl.
*G06F 3/0484* (2013.01)
*G06F 3/0481* (2013.01)
(Continued)

(52) U.S. Cl.
CPC ........ *G06F 3/04845* (2013.01); *G06F 3/0481* (2013.01); *G06F 3/04883* (2013.01); *G09G 3/003* (2013.01); *G06F 3/017* (2013.01); *G06F 3/0486* (2013.01); *G06F 3/04842* (2013.01); *G06F 2203/04802* (2013.01); *G06F 2203/04808* (2013.01); *G06T 15/005* (2013.01); *G06T 15/80* (2013.01); *G06T 19/20* (2013.01); *G06T 2215/12* (2013.01); *G06T 2219/2016* (2013.01); *G06T 2219/2021* (2013.01)

(58) Field of Classification Search
CPC .... G06F 3/04845; G06F 3/0481; G06T 15/80
See application file for complete search history.

(56) References Cited

U.S. PATENT DOCUMENTS 6,031,519 A  *  2/2000  O'Brien ............... G03H 1/0005
                                                                345/156
9,383,895 B1 *  7/2016  Vinayak ................. G06F 3/017
(Continued)

OTHER PUBLICATIONS

Michael Barr, "Introduction to Closed-Loop Control", published Jul. 31, 2002 to https://www.embedded.com/electronics-blogs/beginner-s-corner/4023995/Introduction-to-Closed-Loop-Control, retrieved Jun. 20, 2019 (Year: 2002).*

(Continued)

*Primary Examiner* — Shourjo Dasgupta
(74) *Attorney, Agent, or Firm* — Brinks Gilson & Lione

(57) ABSTRACT

A system includes a holographic display that may create multi-dimensional images. The holographic display may be coupled to processing circuitry and display controller circuitry that may generate a multi-dimensional interface. The multi-dimensional interface may accept input from human interface devices that may translate human motion in multi-dimensional space into the multi-dimensional space of the multi-dimensional interface. The multi-dimensional interface may be generated by a holographic interface stack executing on the processing circuitry.

20 Claims, 24 Drawing Sheets

(51) Int. Cl.
*G06T 15/80* (2011.01)
*G06F 3/0488* (2013.01)
*G09G 3/00* (2006.01)
G06T 15/00 (2011.01)
G06T 19/20 (2011.01)
G06F 3/0486 (2013.01)
G06F 3/01 (2006.01)

(56) References Cited

U.S. PATENT DOCUMENTS

| | | | |
|---|---|---|---|
| 2002/0133478 A1* | 9/2002 | Dionne | G06F 8/315 |
| 2004/0001111 A1* | 1/2004 | Fitzmaurice | G02B 27/2271 |
| | | | 715/848 |
| 2011/0191707 A1* | 8/2011 | Lee | G06F 3/011 |
| | | | 715/765 |
| 2014/0160145 A1* | 6/2014 | Kim | G03H 1/2294 |
| | | | 345/589 |
| 2014/0201666 A1* | 7/2014 | Bedikian | G06F 3/017 |
| | | | 715/771 |
| 2017/0068213 A1* | 3/2017 | Rhee | G06F 3/011 |
| 2017/0139548 A1* | 5/2017 | De Las Heras | G06F 3/0482 |

OTHER PUBLICATIONS

BBC Click, "Holographic pyramid creates a world on your table—BBC Click" 1 minute 11 second video on www.YouTube.com, published on Jun. 22, 2015, and obtained from the Internet at URL: https://www.youtube.com/watch?v=ozMofcEcgoE on Jun. 13, 2018.

* cited by examiner

CLOSED-LOOP DISPLAY CONTROL FOR MULTI-DIMENSIONAL USER INTERFACE GENERATION

TECHNICAL FIELD

This application claims priority to Indian Provisional Patent Application Serial No. 201641030098, filed 2 Sep. 2016, and titled Complex System for Multi-Dimensional User Interface Generation. This application also claims priority to Indian Non-Provisional Patent Application Serial No. 201641030098, filed 28 Jul. 2017, and titled Closed-Loop Display Control for Multi-Dimensional User Interface Generation.

TECHNICAL FIELD

This disclosure relates to generation and operation of multi-dimensional user interfaces.

BACKGROUND

Rapid advances in user interface technologies, driven by immense customer demand, have resulted in widespread adoption of mobile and computerized devices for productivity and entertainment. As one example, computerized devices may be used to assist operators of utility infrastructure systems such as smart grids. As another example, mobile devices are widely used for multimedia capture and playback. Improvements in user interface functionality will further enhance the capabilities of mobile and computerized devices.

DETAILED DESCRIPTION

Figure 1:
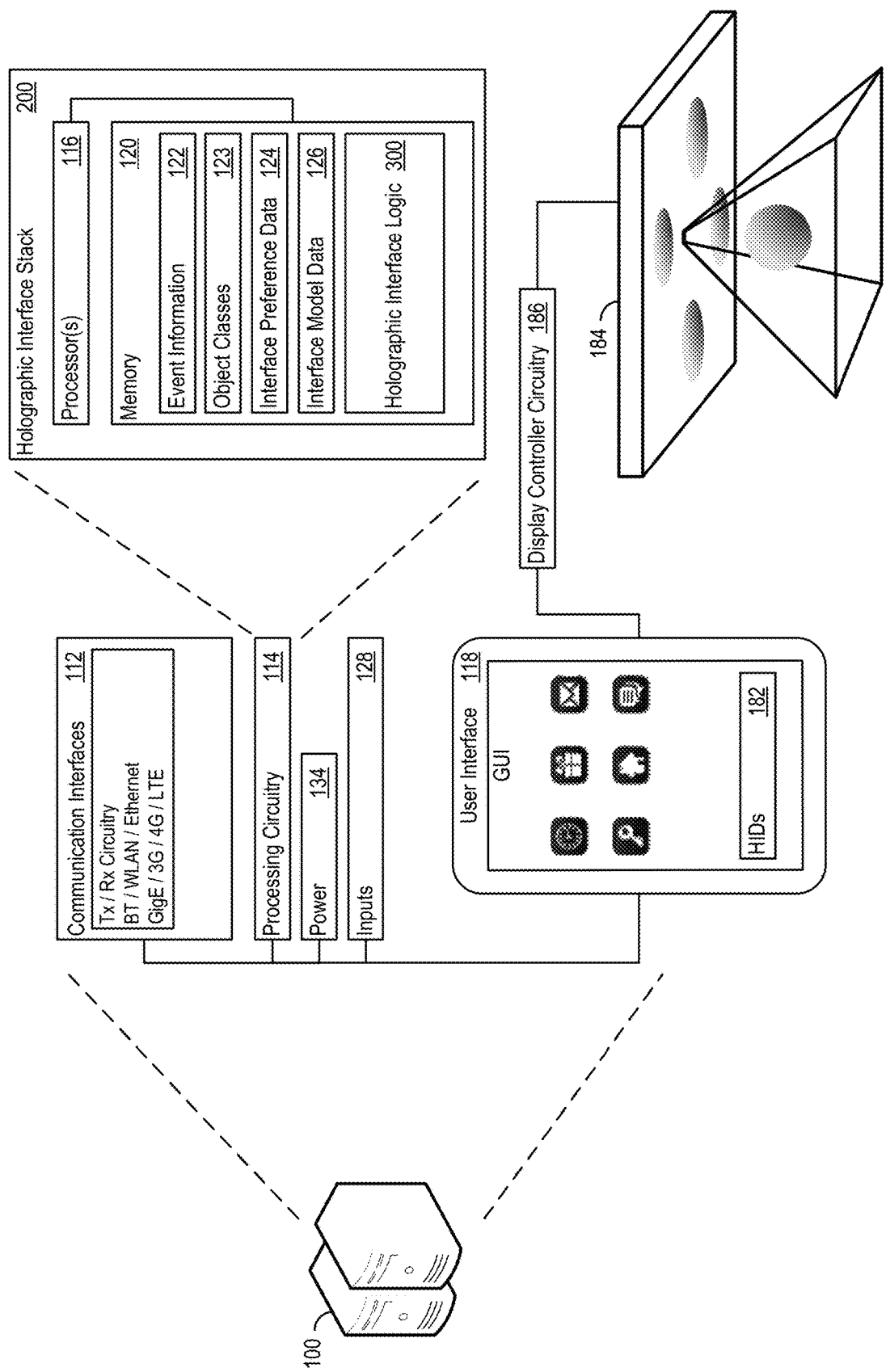
FIG. 1 shows an example interface operation execution environment.

For various computer systems, a user may be tasked with managing a complex array of inputs, outputs, preferences, file databases, or other objects, e.g., logical or physical, through a user interface. In some cases, to address the complexity, interface organizational tools, such as multi-dimensional interface structures, may be used to present the objects to the user in an intuitive manner. Accordingly, the overall operation of the underlying hardware device may be improved by the increased functionality, usability, and versatility of a user interface, for example, a user interface with multi-dimensional structures. Further, increases in the speed and ease of design and generation of such user interfaces may improve the overall operation of the underlying hardware because a greater availability of customized and application specific interfaces may contribute to more positive user experiences and device efficiency. Expressed another way, the interface techniques described below increases the operator's awareness and comprehension of the currently applicable interfaces, thereby achieving a more efficient operator-machine interface. The rendering of the interfaces goes beyond the mere presentation of information, and enhances the overall operation of a device that includes the interface techniques.

In addition, a holographic multi-dimensional display may be used to display three-dimensional (3D) or other dimensional interface objects for the user interface. In some cases, the holographic display may allow for the display of 3D objects in 3D space and allow for viewing from multiple or all (e.g., 360 degrees) angles. Display controller circuitry may drive the holographic display to render the 3D interface objects.

Processing circuitry running a holographic interface stack may implement closed loop control over the display controller circuitry. In closed-loop systems, a control station controls one or more operational states, e.g., transmission power, activity states, or other states, of a client device. Similarly, the processing circuitry (e.g., the control station) in data communication with the display controller circuitry (e.g., the client device) may control the drive output of the display controller. Closed-loop control may reduce errors and aberrant operation of the display controller circuitry thereby improving operational stability and predictability of operation. Accordingly, using processing circuitry to implement closed-loop control over display controller circuitry may improve the operation of the underlying hardware of the system. Hence, systems implementing closed-loop control with processing circuitry offer improvements over existing market solutions.

The holographic interface stack executing on the processing circuitry may control operation of the processing circuitry. A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the holographic interface stack, the renderer layer may provide hardware-based graphics processing for the scene controller layer prior to scene compilation. Hence, the renderer layer may provide a hardware resource, e.g., hardware-based graphics processing, to the scene controller layer. Accordingly, the holographic interface stack architecture improves the operation of the underlying hardware by, for example, improving the efficiency by which hardware resources are provided to the stack layers.

FIG. 1 shows an example interface operation execution environment (IOEE) 100. The IOEE 100 may include processing circuitry 114 to support operation and display of holographic interface structures. The processing circuitry 114 may include processors 116, memory 120, and/or other circuitry, which may be used to implement the holographic interface stack 200, which may be managed by the holographic interface logic (HIL) 300. The memory 120 may be used to store event information 122, object classes 123, interface preference data 124, HIL 300, and/or interface model data 126. The memory may further include applications and structures, for example, coded objects, templates, or other data structures to support operation and display of holographic interfaces.

The IOEE 100 may also include communication interfaces 112, which may support wireless, e.g. Bluetooth, Wi-Fi, WLAN, cellular (3G, 4G, LTE/A), and/or wired, ethernet, Gigabit ethernet, optical networking protocols. The communication interface 112 may support communication with data sources and communication partners for the multi-dimensional interface or applications running thereon. The IOEE 100 may include power management circuitry 134 and various input interfaces 128.

The IOEE 100 may also include a user interface 118 that may include human interface devices (HIDs) 182. The UI 118 may include a holographic display, such as a 3D display or other multi-dimensional display 184. The holographic display may be driven by display controller circuitry 186, which may receive closed-loop control instructions from the processing circuitry 114 Further the human interface devices (HIDs) may include mice, trackballs, keyboards, or other human interface devices. Additionally or alternatively, the human interface devices 182 may include interface systems capable of tracking human gestures, such as touchpads, touchscreens, multi-touch surfaces, cameras, sonar devices, optical ranging devices, Xbox Kinect®, WiiMotes®, or other systems capable of tracking human movements, such as those in a 3D space.

Additionally or alternatively, the IOEE 100 may be deployed as a distributed system. For example, various processing or memory components may be implemented using cloud-based hardware or other remote systems. However, centralized and self-contained implementations may be used.

Figure 2:
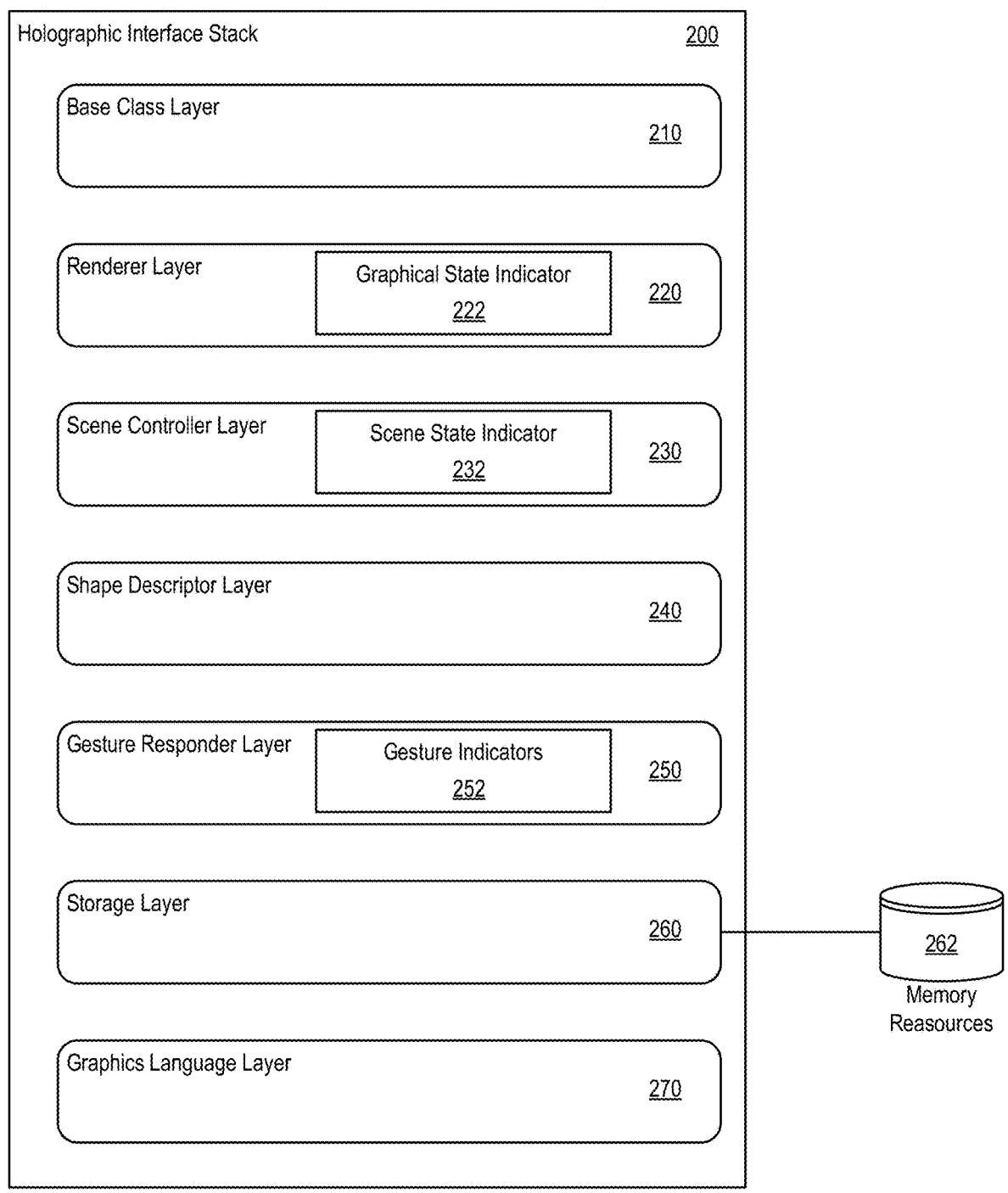
FIG. 2 shows an example holographic interface stack.
Figure 3:
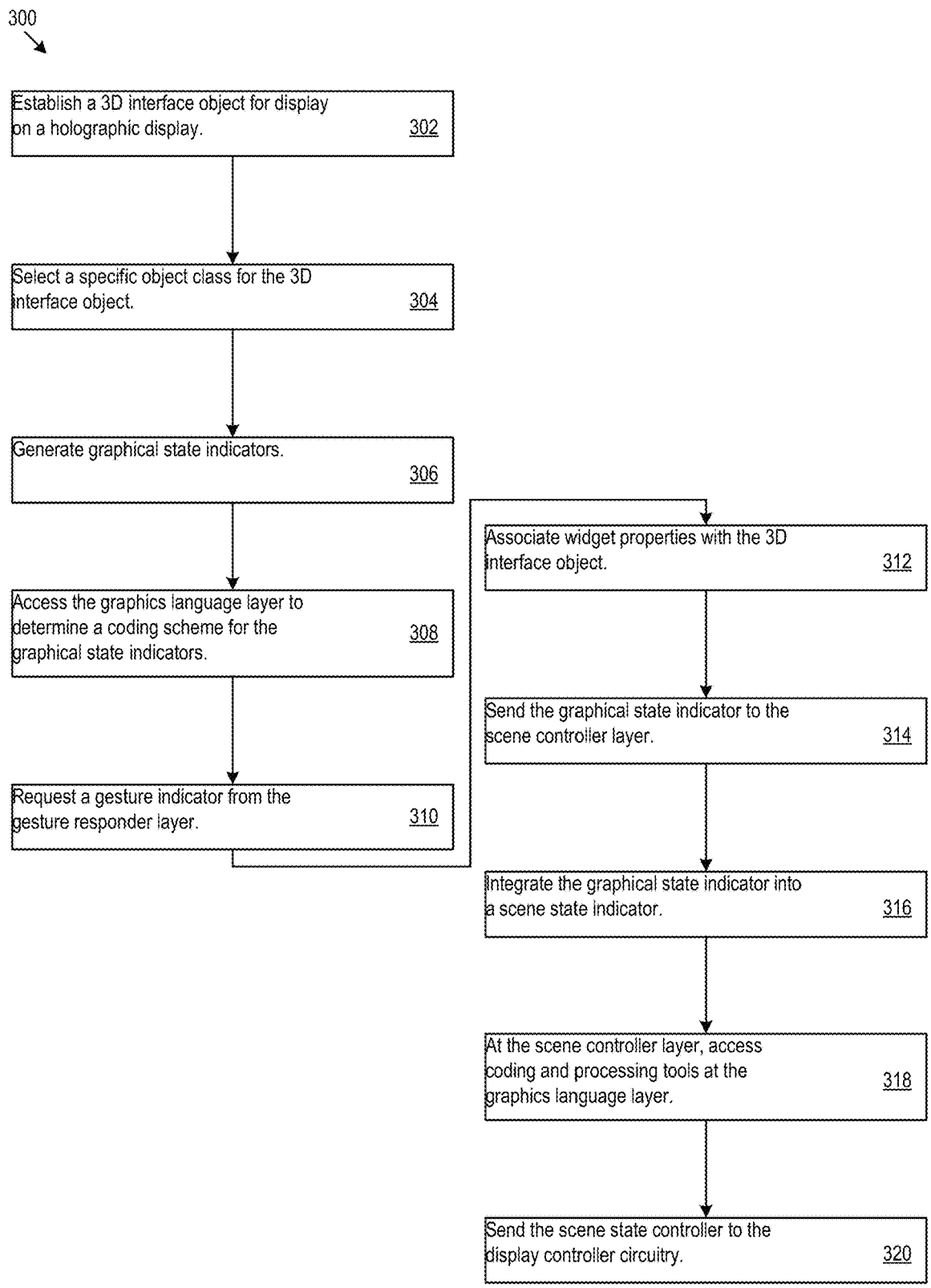
FIG. 3 shows operation of example holographic interface logic.

FIG. 2 shows an example holographic interface stack 200, and FIG. 3 shows complementary operation of the HIL 300.

The holographic interface stack may include a base class layer 210, a renderer layer 220, a scene controller layer 230, a shape descriptor layer 240, a gesture responder layer 250, a data storage layer 260, and a graphics language layer 270. In various implementations, one or more of the above layers may be omitted altogether or included at a different logical or structural level of the holographic interface stack.

At the base class layer 210, the HIL 300 may establish a 3D interface object for display on the holographic display 184 (302). For example, the 3D interface object may include an object for display and/or interaction on the holographic interface. The HIL 300 may select a specific UI object class for the 3D interface object (304). For example, the specific UI object class may include one or more of the object classes discussed below, or another object class (e.g., a custom object class developed using a software developer kit (SDK) for the holographic interface).

Once the HIL 300 selects the specific UI object class, the HIL 300 may cause the renderer layer 220 to generate graphical state 222 indicators for the 3D interface object (306). To generate the graphical state indicators 222 the renderer layer 220 may access hardware-based graphics resources such as graphics processing unit (GPU) cycles, hardcoded-math libraries, or other hardware-based graphics resources. Additionally or alternatively, the renderer layer 220 may access the graphics language layer 270 to determine proper a coding scheme for the graphical indicators, which may be readily deciphered and processed by the scene controller layer 230 (308).

In some implementations, the graphics language layer 270 may include an OpenGL™ (Open Graphics Language) graphics platform. However, other graphics platforms such as DirectX™ may be used. The graphics language layer may provide proper coding and processing tools such that graphical descriptors may be deciphered and processed by the renderer and scene controller layers and the graphics processing hardware implemented by these layers.

The generation of the graphical state indicators 222 at the renderer layer may be based on the association of the 3D interface object with selected object properties. The selected object properties may include transform properties, gesture response properties, widget properties, or other object properties, such as those defined for customized system using an SDK.

In some implementations, transform properties may control the size, position, orientation, and appearance of the 3D interface object. The shape descriptor layer may handle transform attributes for 3D interface objects. For example, the shape descriptor layer may track the position and orientation of a 3D interface object. The shape descriptor layer 240 The HIL 300 may request a transform attribute from the shape descriptor layer. Once, the HIL 300 receives the transform attribute, the HIL 300 may perform a scaling operation a rotation operation, a positioning operation, or any combination thereof on the 3D interface object at the renderer layer. For example, the renderer layer 220 may access coding and processing tools at the graphics language layer 270 to support the operations. The coding and processing tools may include shader tools for applying surface feature, bump-mapping tools for adding detailed surface structure, or other tools to support rendering of 3D interface objects.

Gesture response properties may include pre-programmed and/or adaptive responses to specific gestures, which may be received from an HID 182, such as those described above. In some cases, gestures may include hand gestures derived from a model of the hand, e.g., a palm with multiple finger positions, rotations, extensions, or other configurations. The gesture responder layer 250 may manage gesture indicators 252. The gesture indicators 252 may include indications of associated gestures for particular 3D interface object and responses for the associated gestures. In various implementations, 3D interface objects may be associated with particular gesture types. For example, a media input/output cube may be associated with hand rotation gestures to allow an operator to select/activate a widget property associated with a particular face of the cube by rotating that face into view. Further, for example, a decision ball or toggle-switch-type object may be associated with a translation gesture to allow the decision ball or toggle switch to be moved among various input positions. Accordingly, various different 3D interface objects may be associated with one or more different gestures.

The HIL 300 may request a gesture indicator 252 from the gesture responder layer 250 responsive to the base class layer 210 selecting the specific UI object class (310).

The gesture indicators may include one or more response indications along with the gesture indications. The response indications, may detail one or more preset or adaptive responses to a particular gesture. For example, the indications may include instructions to alter transform attributes of the 3D interface object. Alterations to transform attributes may be forwarded to the shape descriptor layer 240 by the HIL 300. Preset responses may include gesture responses for which the effect of a particular gesture is predefined by the gesture responder layer 250. In some cases, preset responses may include preset changes to transform attributes or other preset changes.

In some implementations, widget properties may include inputs, outputs, tools, or other interactive features that the HIL 300 may associate with the 3D interface object (312). For example, the inputs, outputs, and tools may include audio channels, video channels, image channels, text interfaces, media windows, or other media interfaces. The HIL 300 may send the widget properties to renderer layer 220, which may update the graphical state indicator for the 3D interface object to include a graphical representation associated with the widget properties. The graphical representation may be renderable on the surface of the 3D interface object. For example, an audio input may include a graphical representation of a microphone, while an audio output may include a graphical representation of a speaker. Additionally or alternatively, a text input widget may include a HID (e.g., gesture-driven) keypad or speech-to-text input.

In some cases, the widget property may further include an association with a memory access resource (e.g., access to a hardware-based memory resource 262) provided by the storage layer 260. The memory access resource may allow the widget to store input streams or access stored streams for playback or presentation on output channels.

The renderer layer 220 may send the graphical state indicator to the scene controller layer (314). The scene controller layer 230 may integrate the graphical state indicator into a scene state indicator 232 that represents a complied holographic scene (316). For example, the compiled holographic scene may include the 3D interface object along with other 3D interface objects and scene elements such as lighting and borders. The scene controller layer 230 may access coding and processing tools at the graphics language layer 270 to support compilation of the holographic scene (318). For example, the scene controller layer 230 may access a lighting tool from the graphics language layer to support application of a lighting effect to a compiled holographic scene. The HIL 300 may send the scene state indicator to the display controller circuitry for presentation on the holographic display (320).

In some implementations, the holographic interface stack 200 may include an application programming interface (API) or support for a software development kit (SDK) that allows operators to design interface tools and environments for the holographic interface stack. For example, a mobile device based (or other computer based) interface design application compatible with the API and/or SDK may be used to design interface for the holographic display. The interface design application may be used to create and/or modify 3D interface object for a holographic interface.

The methods, devices, processing, circuitry, and logic described above and below may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations are specifically described. However, many other implementations are also possible.

APPENDIX: EXAMPLE IMPLEMENTATIONS

The following appendix includes discussion of an example holographic interface, e.g., holographic User Interface (hUI) and an example interface design application, e.g., holographic studio (hStudio). The example implementations may be implemented using the holographic interface stack 200 discussed above.

hUI represents a 3D UI ecosystem specifically designed for a holographic display system.

hUI achieves a true 3-dimensional and or multi-dimensional experience, in some cases by: the use of 3 dimensions for information representation, and Interpretation of hand/finger gestures for advanced 3-dimensional interaction.

Figure 4:
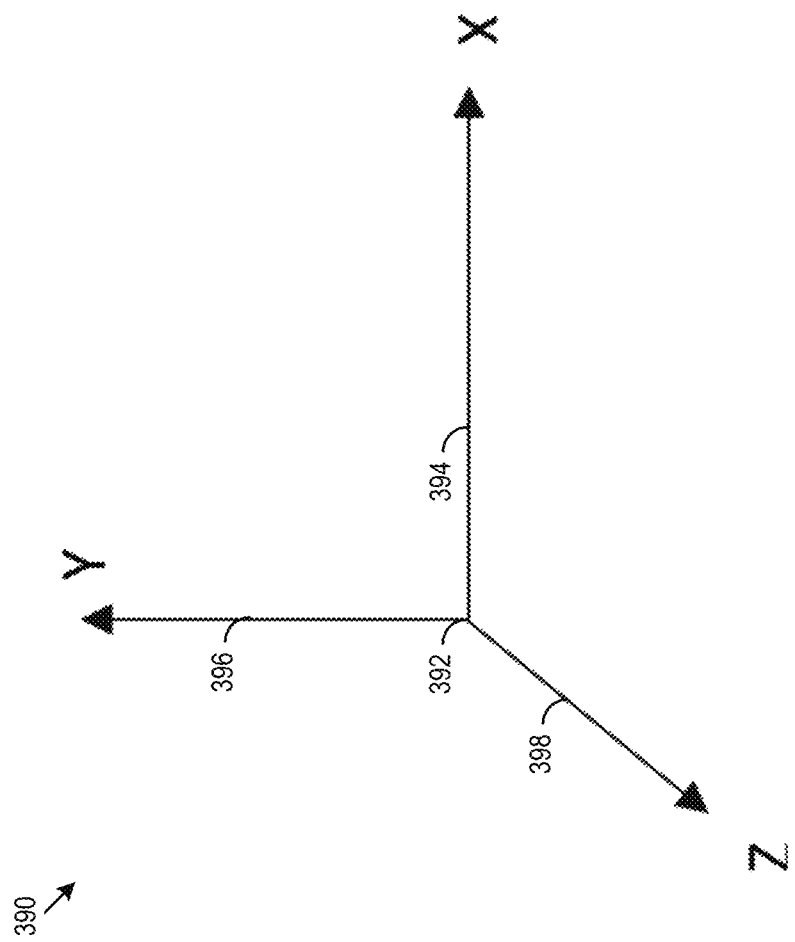
FIG. 4 shows example global axes.

For hUI multiple coordinate references may be used, for example, global coordinates and local coordinates. FIG. 4 shows example global axes 390. The global origin 392 is shown with X 394, Y 396 and Z 398 axes in FIG. 4.

Note that the Z-axis in the hUI implementation may be defined as the axis perpendicular to a 2-dimensional console and points towards the viewer.

Every Cube instance (or instance of any subclass of Cube) has a local coordinate system associated with it. The local coordinate axes are parallel to the global axes by default. However, their origins may be different.

The base class from which all other UI classes in this ecosystem inherit is called the 'Cube' class. The Cube class represents a lump of 3D space with a predefined length, breadth and height. It acts as the base class for more complex 3D UI elements. The Cube class (as well as all other 3D UI elements) contains a 'transform' property which defines its scale, position and rotation with respect to the global/local coordinates.

The 'transform' property has the following attributes:

```
transform {
    positionX: float,
    positionY: float,
    positionZ: float,
    rotationX: float, //rotation (in radians) about the X-axis
    rotationY: float, //rotation (in radians) about the Y-axis
    rotationZ: float, //rotation (in radians) about the Z-axis
    scaleX: float,
    scaleY: float,
    scaleZ: float
}
```

Note here that the 'transform' property only represents the bounds of the cube object. The actual shape of the cube object can be any combination of polygons as defined by the developer. This is achieved using the 'ShapeDescriptor' property of the cube object. This property can take its value from any of the presets, from an external file or from a manual description of the individual polygons and vertices provided by the developer. The ShapeDescriptor may be implemented using the shape descriptor layer 240 discussed above.

Each Cube instance has a 'GestureResponder' associated with it. A 'GestureResponder' takes care of hand/finger gestures in a manner either chosen from any of the several presets or in a manner customized by the developer. The GestureResponder may be implemented using the gesture responder layer 250 discussed above.

Each Cube instance also has a 'Renderer' instance associated with it. The 'Renderer' takes care of the visual representation of the associated Cube instance. It takes into account the current transform, the color (diffuse color, specular color and texture) of the Cube instance as well as any 'Widget' associated with the instance. It also takes into account the lighting of the scene of which the Cube is a part. The Renderer may be implemented using the renderer layer 220 discussed above. In addition to the above, each Cube instance may have an associated 'Widget' as well. This is an optional property. This 'Widget' would be capable of handling any or a combination of the following:
Web page rendering
Multimedia (audio/video/image) rendering
Video/voice/text input Thus, the cube class has the following properties:
transform
GestureResponder
Renderer
Widget (optional)

The ShapeDescriptor class decides the shape of a Cube Object instance (or of an instance of a Cube subclass). As described above, the term 'Cube' should not be confused with the actual shape of a 'cube'. It simply represents a lump of space that a 3D object occupies (please refer to the description above). The ShapeDescriptor property can take its value from any of the hUI presets:
Default (represents a cubical/cuboidal shape)
Sphere (represents a spherical/egg shape with an elliptical cross section)
Cylinder
Wired Cube (a Cube with wired representation, instead of solid)
Wired Sphere
Wired Cylinder The ShapeDescriptor property can also be set from an external file, e.g., the description of the individual constituent polygons may be described in an external file and be read from there to render the 'cube' object.

The GestureResponder class, as mentioned earlier, takes care of hand/finger gestures in a manner either chosen from any of the several presets or in a manner customized by the developer. One thing to note here is that there can be various input devices/methods used in the holographic display system at hand. The GestureResponder takes care of these differences as well. In order to achieve this, the GestureResponder acts on the concept of 'pivots' and 'degrees of freedom'. Let us take the example of finger gestures as an input methodology. In such a system, the GestureResponder would consider the fingers of an average human being as having been constructed out of one pivot point with each finger having 3 degrees of freedom (1 degree of freedom for each direction of motion of the finger).

Figure 5:
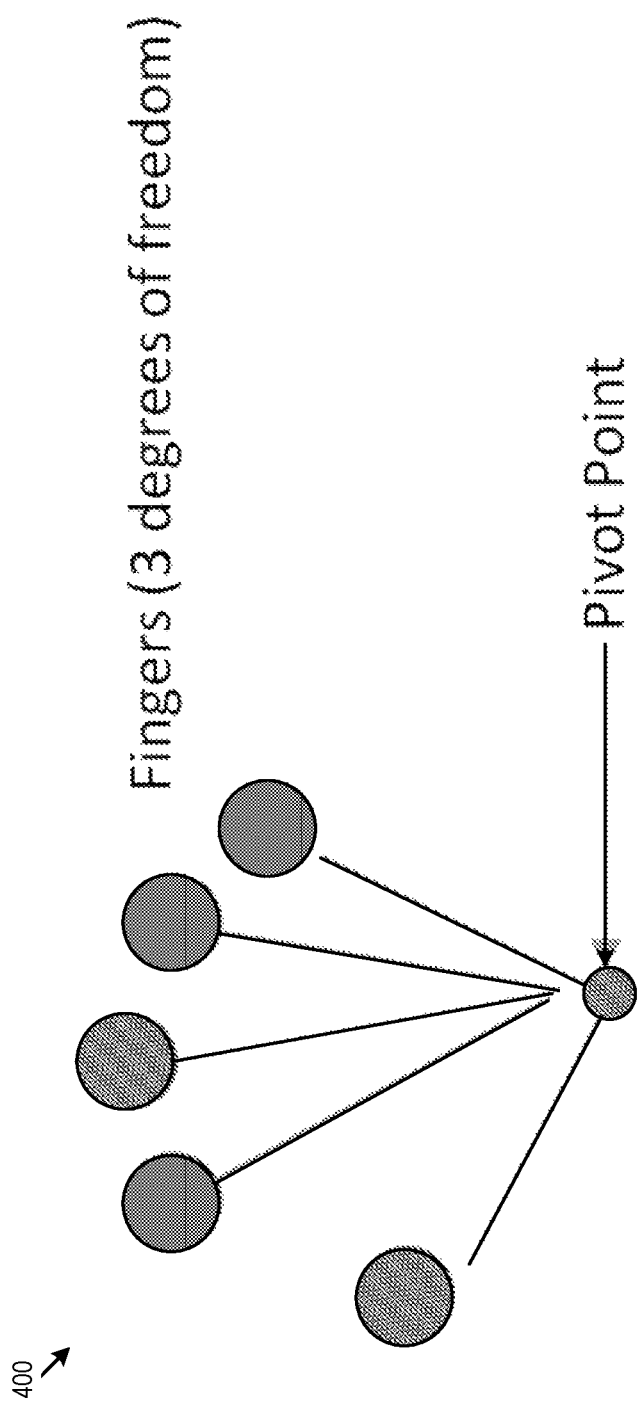
FIG. 5 shows example motion logic.

In the example motion logic 400 shown in FIG. 5, each finger moves in reference to the Pivot Point. The degrees of freedom in this case, depend on the number of directions that the individual fingers are allowed to move. A GestureResponder manages and tracks these movements and interprets them as actions. The GestureResponder class has the following attributes:
associatedObject: The object (3D UI element) which the GestureResponder is associated to.
pivotPoint: The pivot point of the input. There can be multiple pivot points (depending on the input).
attachedNodes: The nodes attached to the pivot point. For example, in the above scenario, the fingers act as the attached nodes. Attached nodes have a specified degree of freedom which can be translational and/or rotational. For example, in case of hand gestures, the degrees of freedom are rotational.
actionDelegateMethods: These are custom/preset delegate methods which would get called upon certain gestures. The developer can then choose to override and customize the method so that, useful code can be executed whenever such an event occurs. For each such call, the gesture data is sent to the delegate method.

Figure 6:
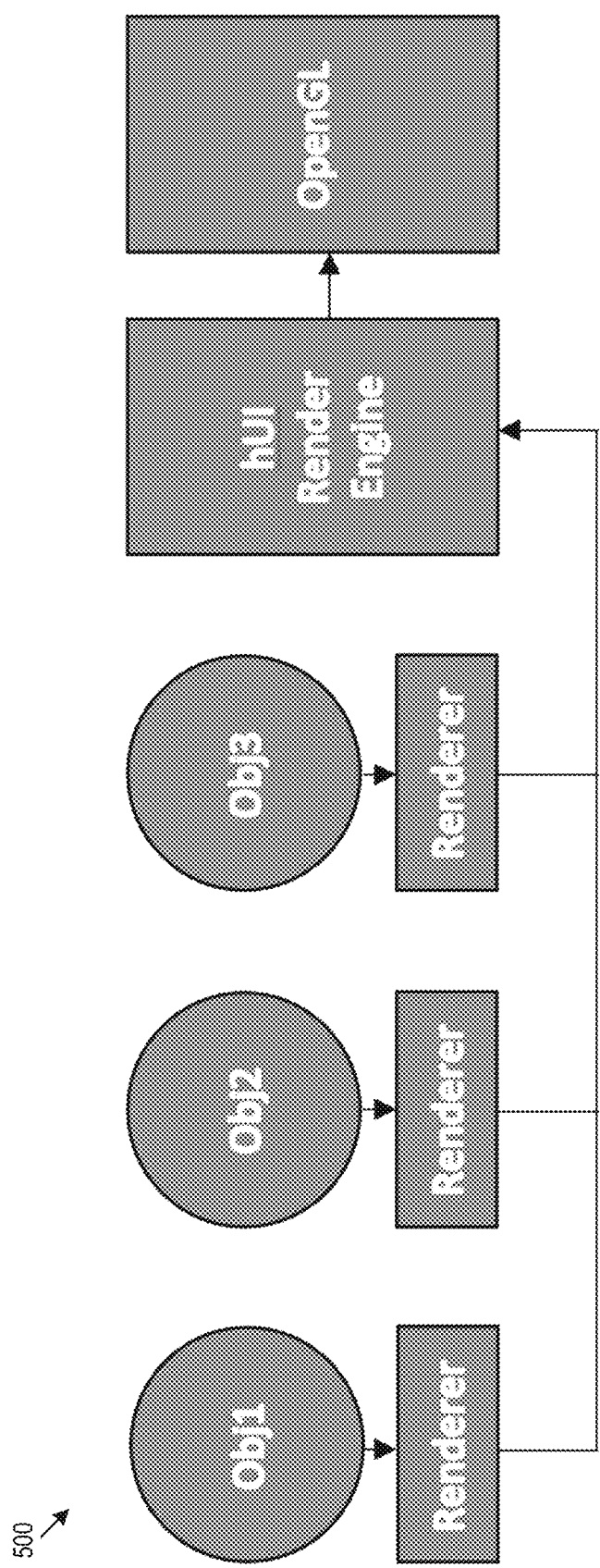
FIG. 6 shows example hierarchy logic for the Renderer.

The Renderer instance associated with a Cube instance (or an instance of a Cube subclass) takes care of the visual representation of the instance over the attached holographic display system. It takes into account the current transform, the color (diffuse color, specular color and texture) of the Cube instance as well as any 'Widget' associated with the instance. It also takes into account the lighting of the scene of which the Cube is a part. A Renderer instance can also be customized to use a custom 'shader'. It works on top of the OpenGL layer, uses the UI description and renders the object over the holographic display system. FIG. 6 shows example hierarchy logic 500 for the Renderer.

As mentioned earlier as well, a Renderer takes into account any widgets attached to the 3D UI element. Any widget that is rendered over any face on the 3D object is treated as a dynamic texture which updates based on the changes in the state of the widget.

Figure 7:
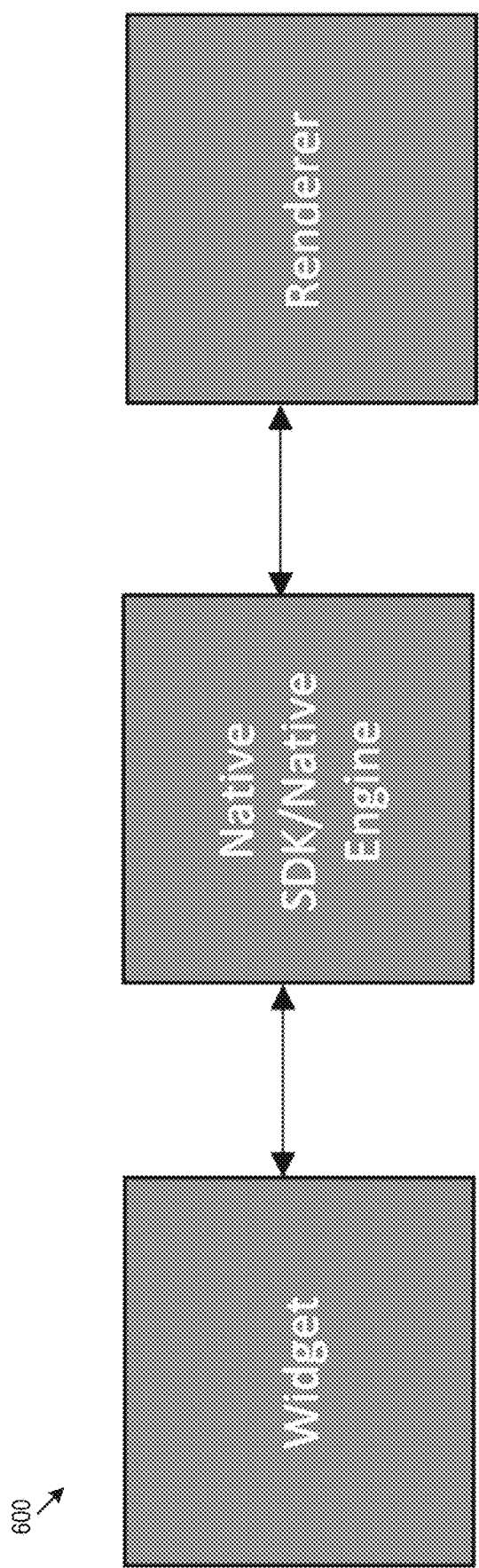
FIG. 7 shows example logic for managing the interaction of a widget with software developer kits or native engines.
Figure 8:
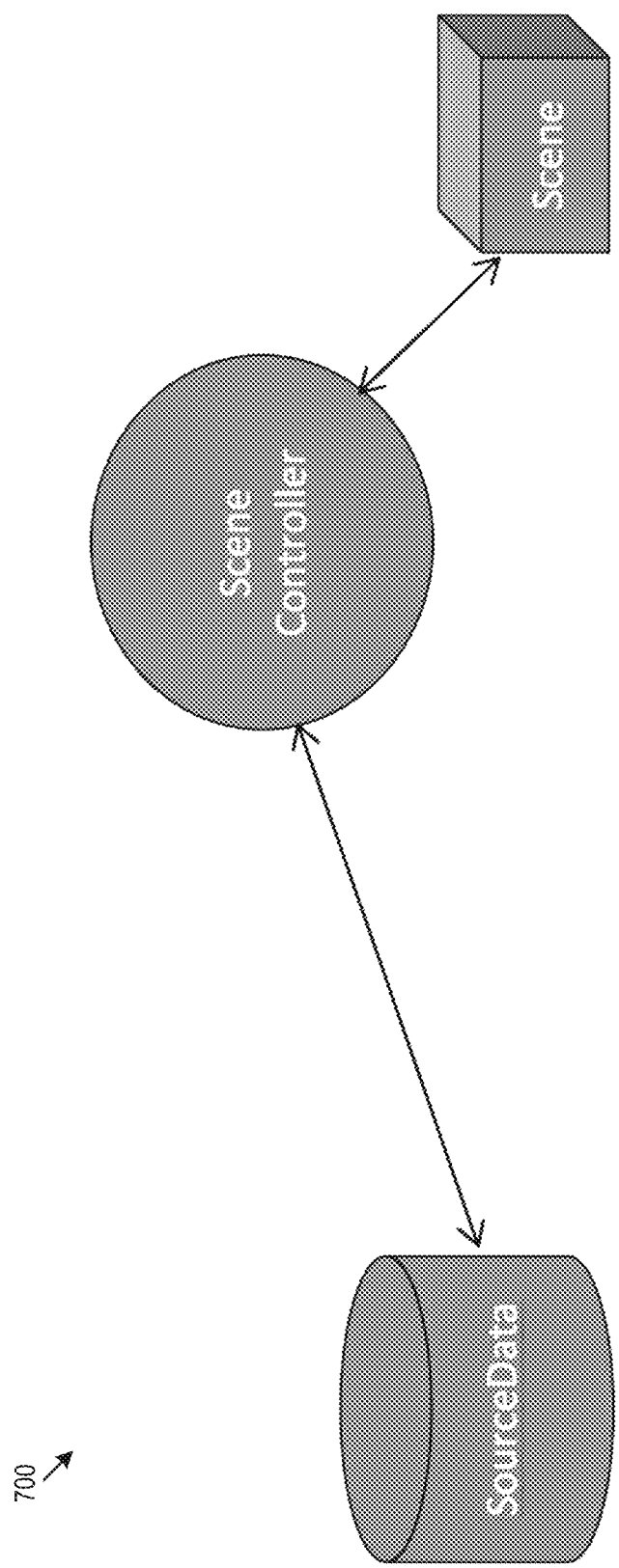
FIG. 8 shows example logic for a scene controller.

The Widget class enhances a 3D UI element and allows it to:

Render a web page/access a web app
Play multimedia content
Open documents
Take Video/Voice/Text input You can attach more than one widget to a 3D UI element. FIG. 7 shows example logic 600 for managing the interaction of a widget with a SDK (software developer kit) or native engines. This allows you to render a web page on one face of the 3D object, take voice input through another face or possibly show a pdf document on another. A widget basically makes a 3D UI element extremely powerful in terms of content and interactivity. A widget takes advantage of the existing APIs and SDKs of the underlying environment:

A web page or a web app is rendered using the native webkit engine
Multimedia content is played using the underlying audio/video engine
Video/Voice/Text input is processed using the native SDK Now, to build a 3D app/presentation, we provide an MVC-based (model view controller—"model" refers to for underlying data model) architecture by default. Multiple 3D UI elements being displayed to the user at a time constitute a "Scene". There can be multiple "scenes" inside a single 3D app/presentation. Scenes can transition from one to another. A single scene will be managed by a corresponding "SceneController". The "SceneController" reads from a "SourceData" object and provides data to the "scene" to render. FIG. 8 shows example logic 700 for a scene controller. The SceneController (e.g., any or all of the SceneController types below) may be implemented using the scene controller layer 230 discussed above.

Let's talk more about the "SceneController" class. SceneController classes can be classified into two broad categories of classes:

Simple SceneController which controls only a single attached "scene".
Composite SceneController which can control multiple other SceneController objects.
Composite SceneControllers can be of 3 types:
BunchSceneController—Controls multiple SceneControllers and presents their corresponding scenes at a time as a 'bunch'.
NavigationSceneController—Controls multiple SceneControllers by managing navigation between them. The managed SceneControllers are arranged in a tree with a single SceneController as the 'root' node. Now, because the NavigationSceneController manages a 'tree' of SceneControllers, there can be a possibility of multi-dimensional navigation (not just to-and-fro) from a single node in the tree. For example, if we have 5 leaf nodes for a particular node, then it is safe to assume that there are 5 different ways of navigation from the parent node.
MultiManagedSceneController—Controls one 'manager' SceneController which, in turn, manages multiple other SceneControllers. Note here that all the SceneControllers (the 'manager' SceneController and the managed SceneControllers) are presented at a time to the user.

Note that a Scene is also implemented as a tree structure wherein, there is a 'root' node to which all other 3D UI elements attach. Thus, a 3D UI element can be a child of another and a 3D UI element can have zero or more children. The Scene class would have the following properties:

A 'scene tree' representing all the 3D UI elements that are part of the scene as described above
A 'lighting model' which specifies the kind of lighting that the objects in the scene are to be lit out with.

Figure 9:
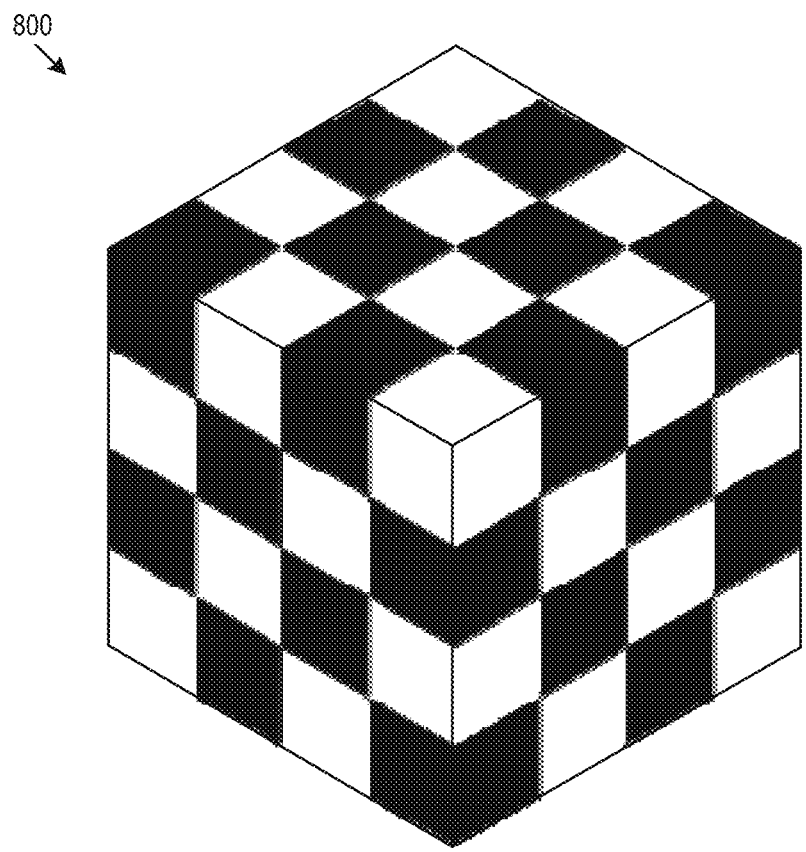
FIG. 9 shows an example cube.

Having described the class structures that would constitute a 3D presentation/app, we can now delve into the library classes that hUI can offer. These are off-the-shelf components that the developer can take and reuse with some or no modification. The following is a list of hUI library classes and their descriptions:

This is a basic Cube object that has 'Default' as the value of its ShapeDescriptor property. The basic Cube has a connected GestureResponder which allows it to be dragged across in the scene. The 'transform' property of the basic Cube object has all its sizing dimensions set to unit values. It doesn't have any widgets attached by default. FIG. 9 shows an example cube 800.

Figure 10:
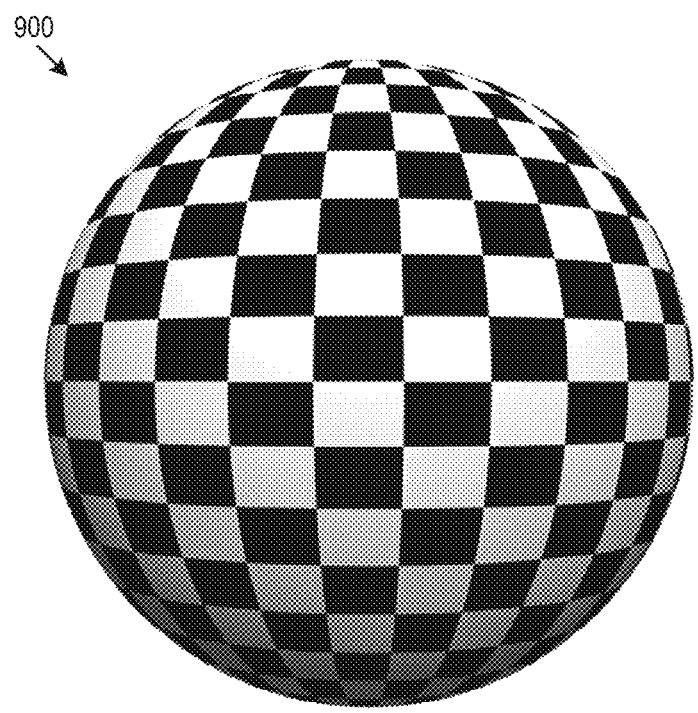
FIG. 10 shows an example sphere.

A Sphere is just a 'Cube' object with its ShapeDescriptor property set to 'Sphere'. This may change that shape and interactive size of the sphere relative to the cube. Thus, the sphere may occupy and interact with a different size and shape space than the cube. However, other of the properties of a Sphere are the same as those of a basic Cube. FIG. 10 shows an example sphere 900.

Figure 11:
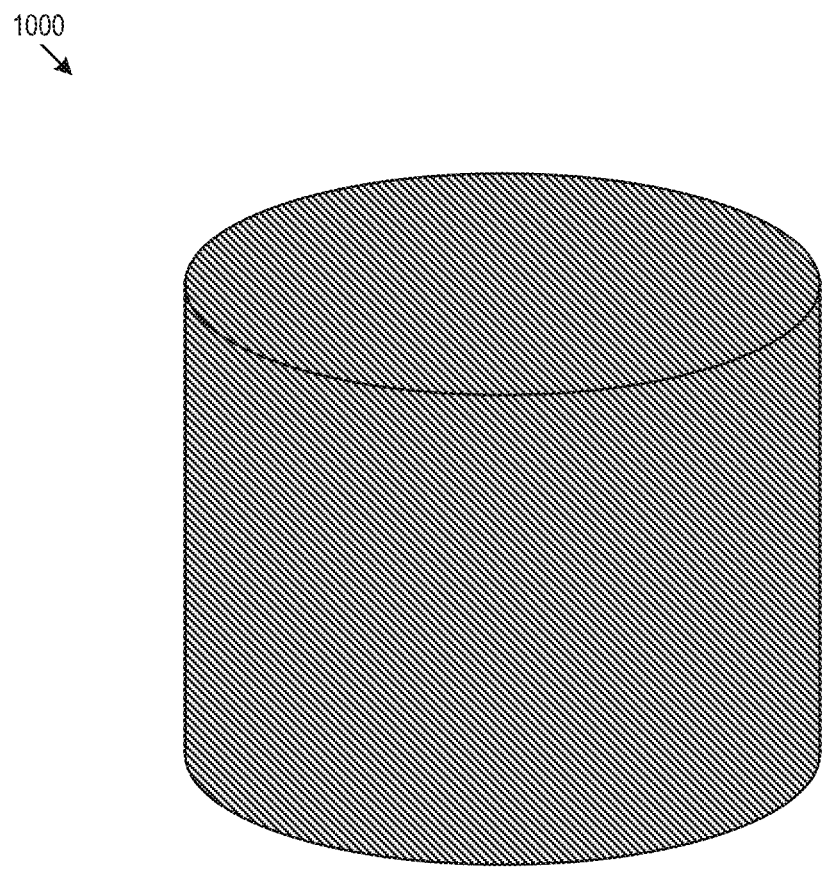
FIG. 11 shows an example cylinder.

A Cylinder is a 'Cube' object with its ShapeDescriptor property set to 'Cylinder'. Other properties of a Cylinder may be the same as those of a basic Cube. FIG. 11 shows an example cylinder 1000.

Figure 12:
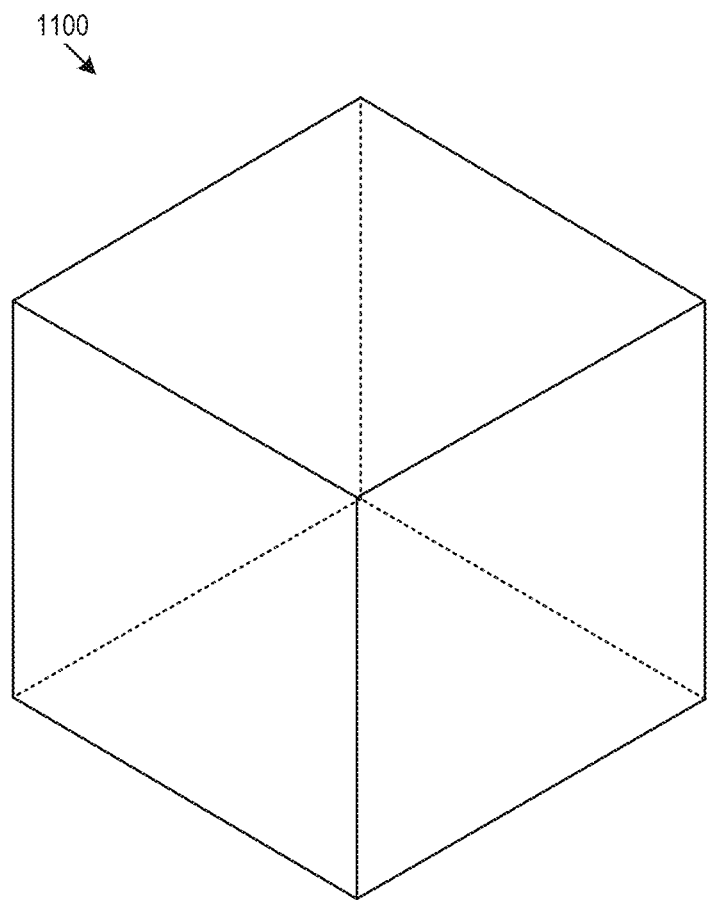
FIG. 12 shows an example wire cube.

A Wire Cube is a 'Cube' object with its ShapeDescriptor property set to 'WireCube'. Other properties of a WireCube may be the same as those of a basic Cube. FIG. 12 shows an example wire cube 1100.

Figure 13:
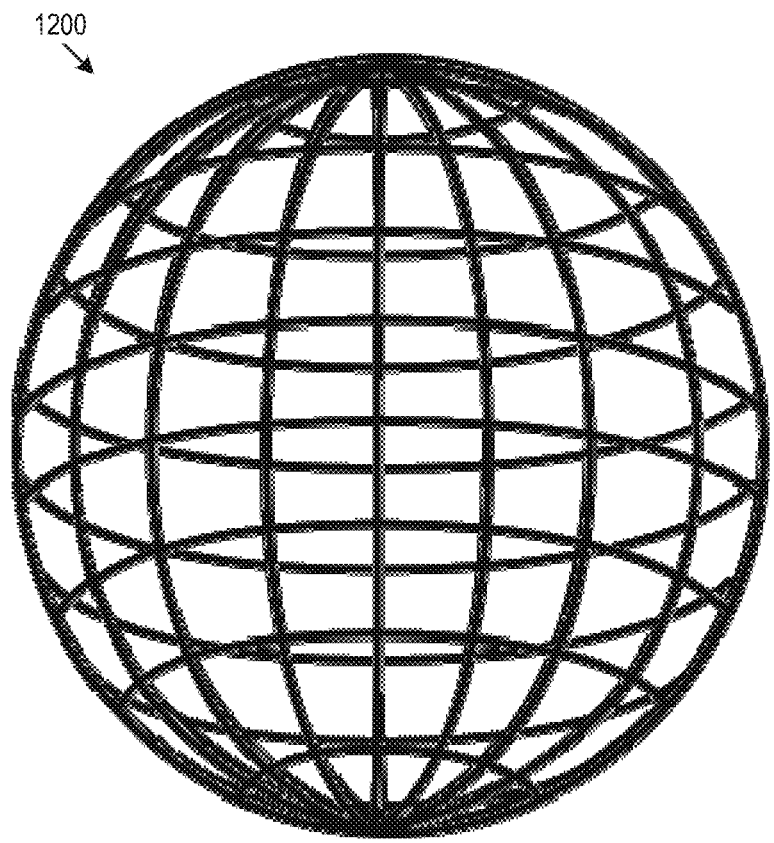
FIG. 13 shows an example wire sphere.

A Wire Sphere is just a 'Cube' object with its ShapeDescriptor property set to 'WireSphere'. Other properties of a WireSphere may be the same as those of a basic Cube. FIG. 13 shows an example wire sphere 1200.

Figure 14:
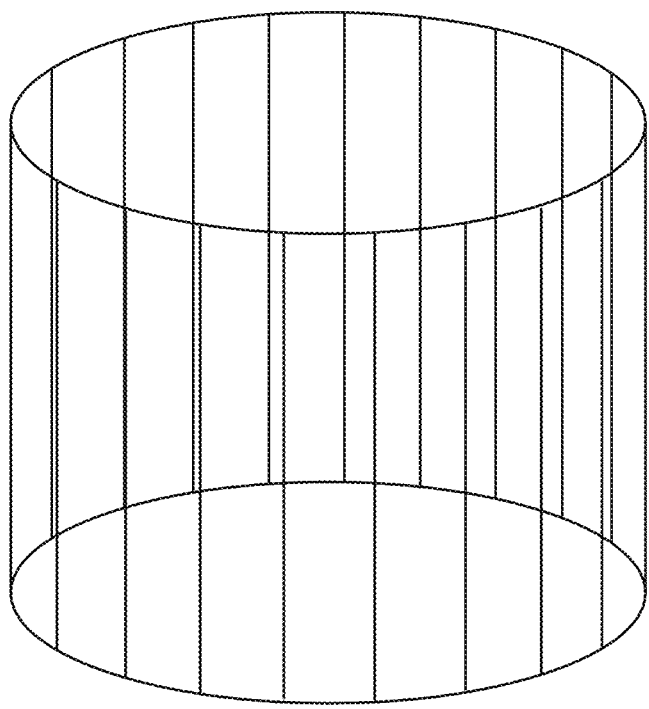
FIG. 14 shows an example wire cylinder.

A Wire Cylinder is just a 'Cube' object with its ShapeDescriptor property set to 'WireCylinder'. Other properties of a WireCylinder may be the same as those of a basic Cube. FIG. 14 shows an example wire cylinder 1300.

Figure 15:
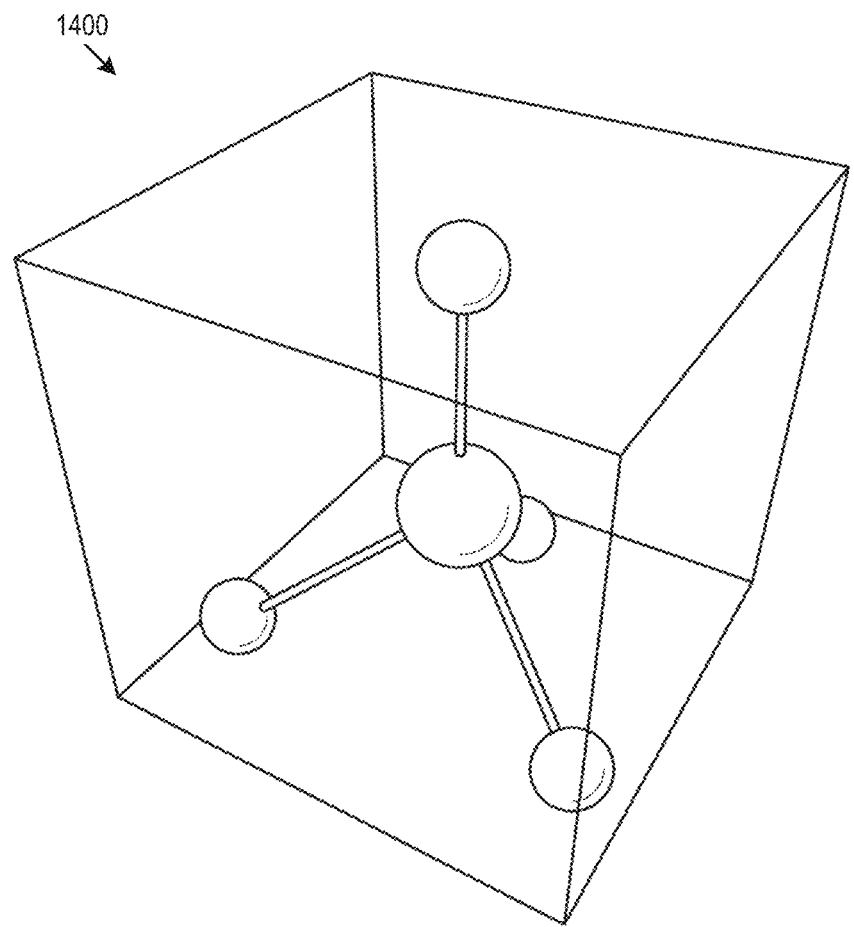
FIG. 15 shows an example scene of a molecular view interface.

A Molecular View can be used to represent hierarchical information. In this figure, the node at the center represents a higher hierarchy as compared to the leaf nodes. The Molecular View consists of a parent cube object at the center to begin with. This parent cube object has a spherical 'shapeDescriptor' property which renders it as a sphere. Attached to this cube object is a 'gestureResponder' which allows it to be dragged across the scene or to be 'tapped' on. Connected to this central cube object are connecting links which are again cube object instances with no gesture responders. Attached to these links are other spherical cube object instances (as shown in the figure) which have gesture responders attached to them that allow them to be tapped on. Tapping on the central cube object reveals/hides the connected 'child' cube objects. Tapping on any of the child cube objects, a custom action can be performed (as specified by the developer). FIG. 15 shows an example scene 1400 of a molecular view interface.

Figure 16:
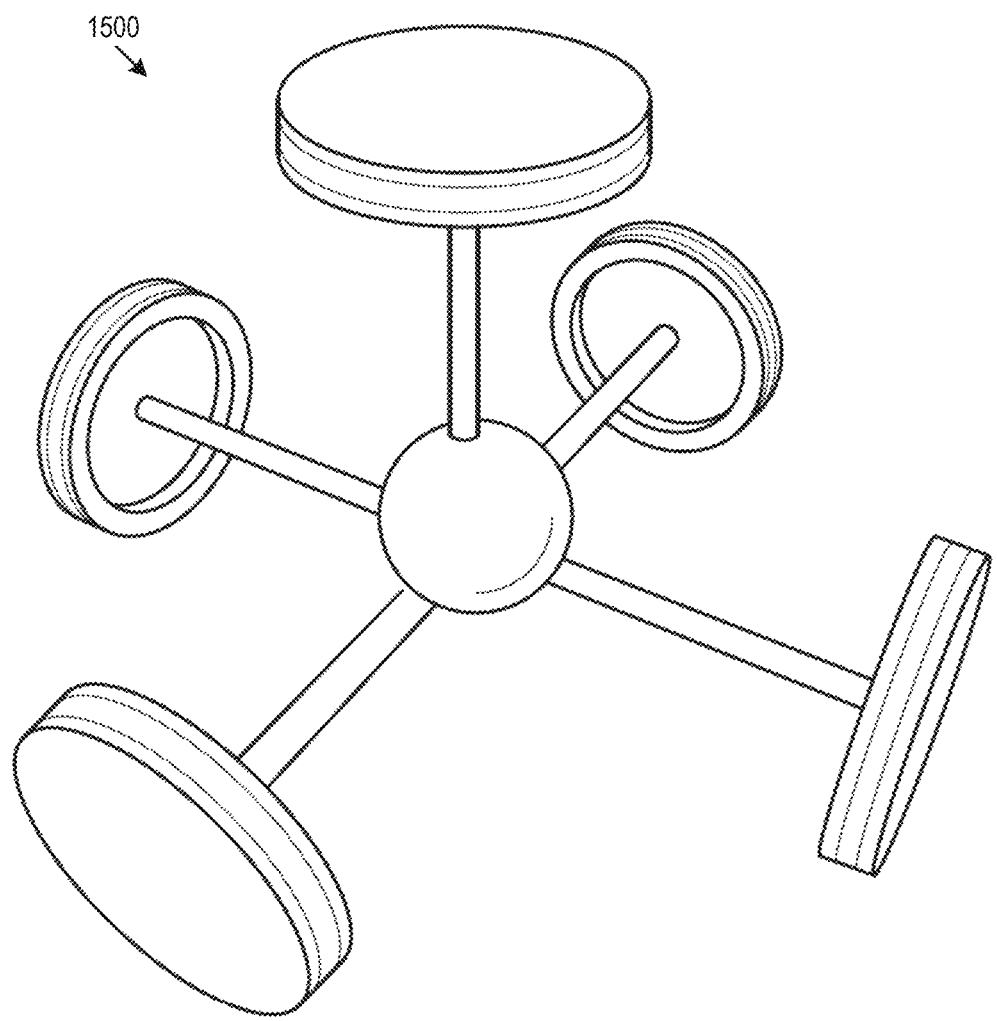
FIG. 16 shows an example scene of an option ball interface.

An Option Ball can be used to allow the user to intuitively select from a wide set of workflows. All he/she has to do is flick the ball towards the desired hub. An Option Ball consists of the 'ball' at the center as shown in the diagram to the left. This ball is hypothetically attached to one or more 'option hubs' (shown as cylindrical structures in the diagram) via Wire Cubes. The ball has an attached GestureResponder which allows the ball to be flicked towards a particular option hub being constrained to move only along the attached Wire Cube (the same Wire Cube that connects the ball to an option hub). FIG. 16 shows an example scene 1500 of an option ball interface.

Figure 17:
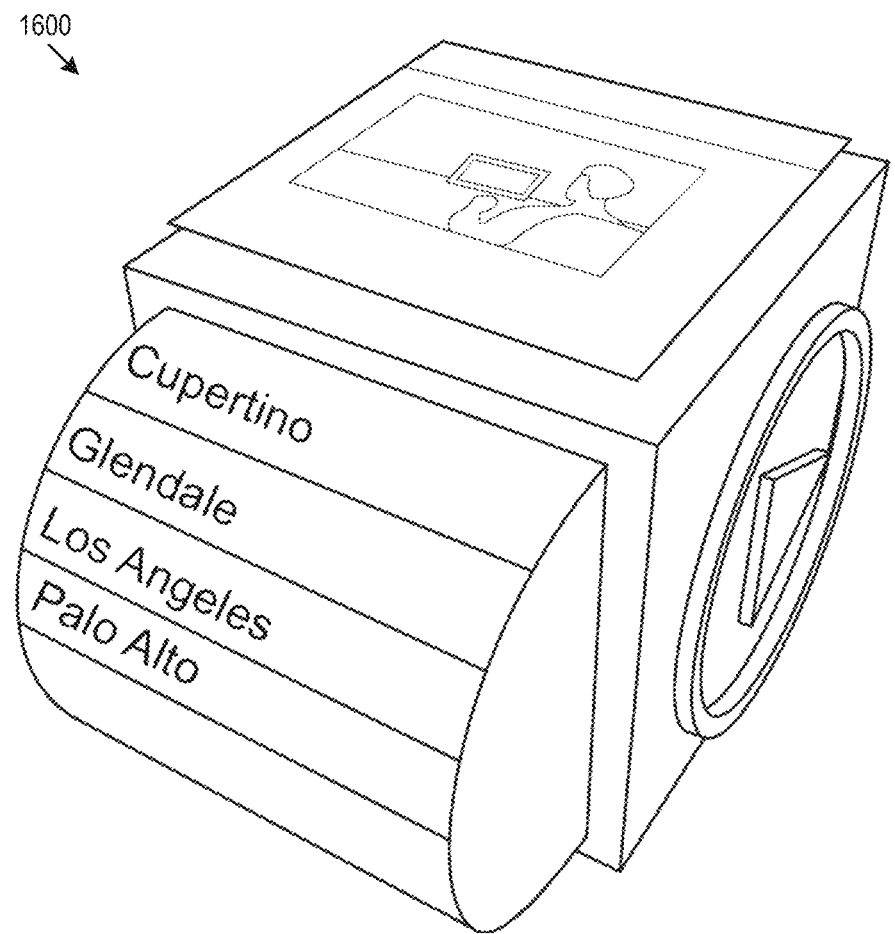
FIG. 17 shows an example scene of a hybrid cube interface.

A Hybrid Cube represents multiple aspects of the same scenario on its multiple faces. The user can interact with the individual faces to work with that particular aspect. For example, one face might open up a web page while another face might take optional input from the user. This is achieved by having different widgets on different faces of a Cube object. FIG. 17 shows an example scene 1600 of a hybrid cube interface. These widgets can be any of the following:

Web widget to display web pages/web apps.
Multimedia widget to play video/audio/interactive content.
Table widget to display/input tabular information.
Document widget to display documents of different formats, viz., .doc, .docx, .pdf etc.

Figure 18:
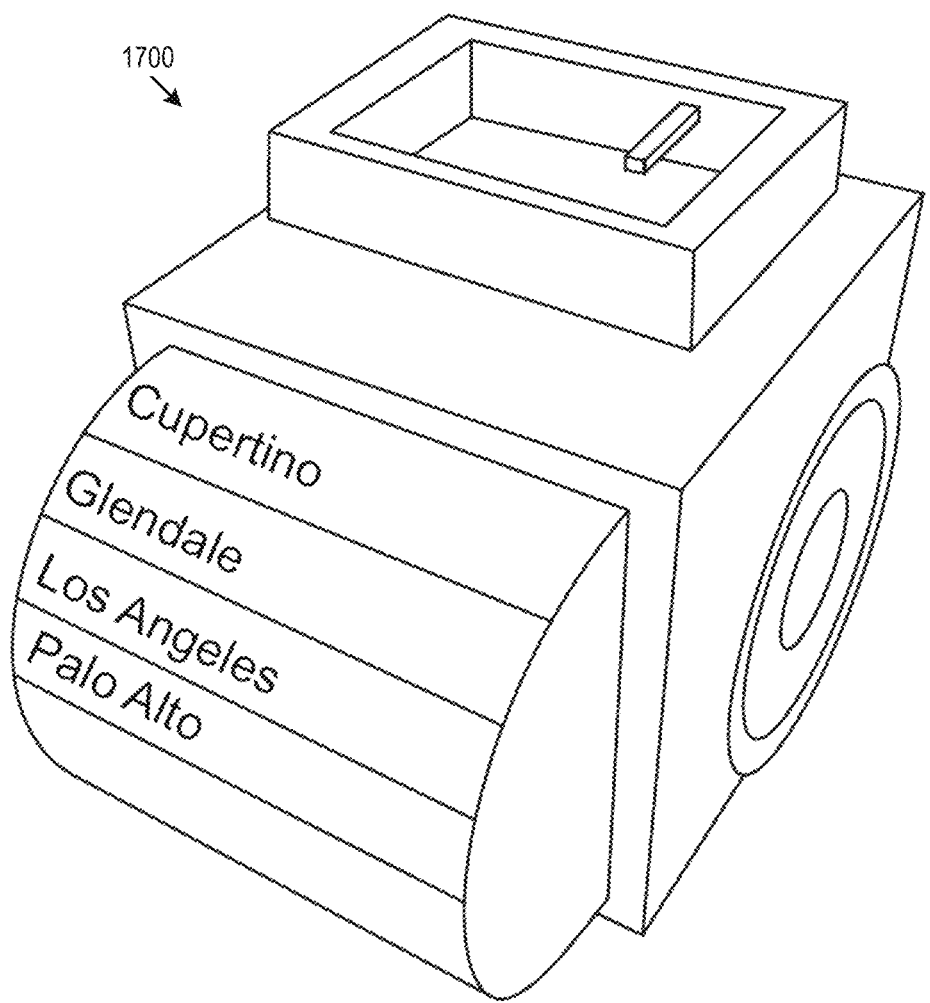
FIG. 18 shows an example scene of a hybrid input cube interface.

A Hybrid Input Cube represents a multi-faced approach to taking user input for a particular scenario. For example, one face might represent text input while another might represent voice input. This is achieved by having different widgets on different faces of a Cube object. FIG. 18 shows an example scene 1700 of a hybrid input cube interface. These widgets can be any of the following:

Text input widget to accept text input.
Table widget to display/input tabular information.
Audio/voice input widget to accept sound input.
Video input widget to accept video input.

Figure 19:
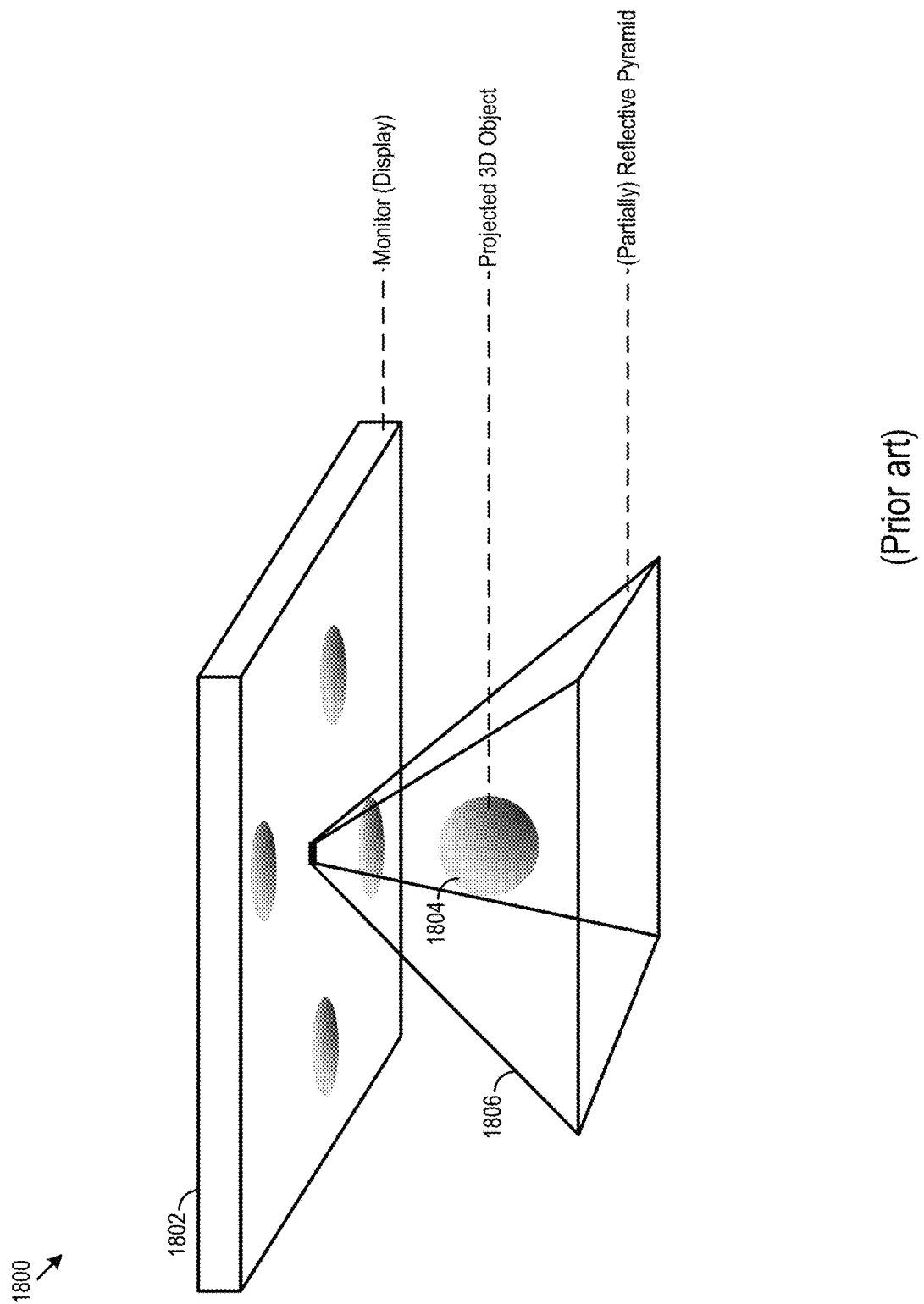
FIG. 19 shows an example hologram pyramid.

In an example scenario, the hologram pyramid may be a projection based system. The hologram pyramid may be a semi-transparent 4-sided pyramid with a flat display device (a monitor or a tablet) placed above the apex of the pyramid. FIG. 19 shows an example hologram pyramid. The hologram pyramid 1800 may include a monitor 1802, a projected scene 1804, and a reflective pyramid 1806. In some implementations, the reflective pyramid may be glass or another fully (or partially) reflective material. The pyramid may be opaque or transparent. In some cases, a transparent material may provide a more apparent 3D effect. However, an opaque material may allow for less background interference with the image.

It works by displaying a composite image/video showing four sides of the same 3D object on the monitor. Each of the four sides of the object is thus, reflected to the viewer by the corresponding side of the hologram pyramid.

The hologram pyramid can be augmented with a motion-sensing device (e.g., Leap Motion Sensor™ or Microsoft Kinect Controller™) allowing users to interact with the projected 3D scene using finger/hand gestures.

However, virtually any 3D display system with multiple viewing angles may be used as a holographic display. For example, other pyramid types with different numbers of sides may be used. Further, non-pyramid displays may be used.

hStudio is a productivity tool designed for developers and end-users who would want to leverage the concept of hUI to design and build apps/presentations for an interactive 3D holographic display system. As discussed earlier, such a system consists of a motion-sensing device connected to a holographic display device. hStudio would allow the user to connect the 3D app/presentation with the motion-sensing device seamlessly under the hood.

hStudio would be built on top of an OpenGL/DirectX/WebGL layer. While the OpenGL/DirectX/WebGL layer would take care of all the low level GPU calls required to render the desired 3D scene, hStudio would allow the user to solely focus on the higher level details of his/her 3D app/presentation without worrying too much about the lower level nitty-gritty details.

In order to achieve this, an SDK would be provided, known as the 'hSDK'. hSDK would provide frameworks for facilitating the development of a 3D app/presentation.

Figure 20:
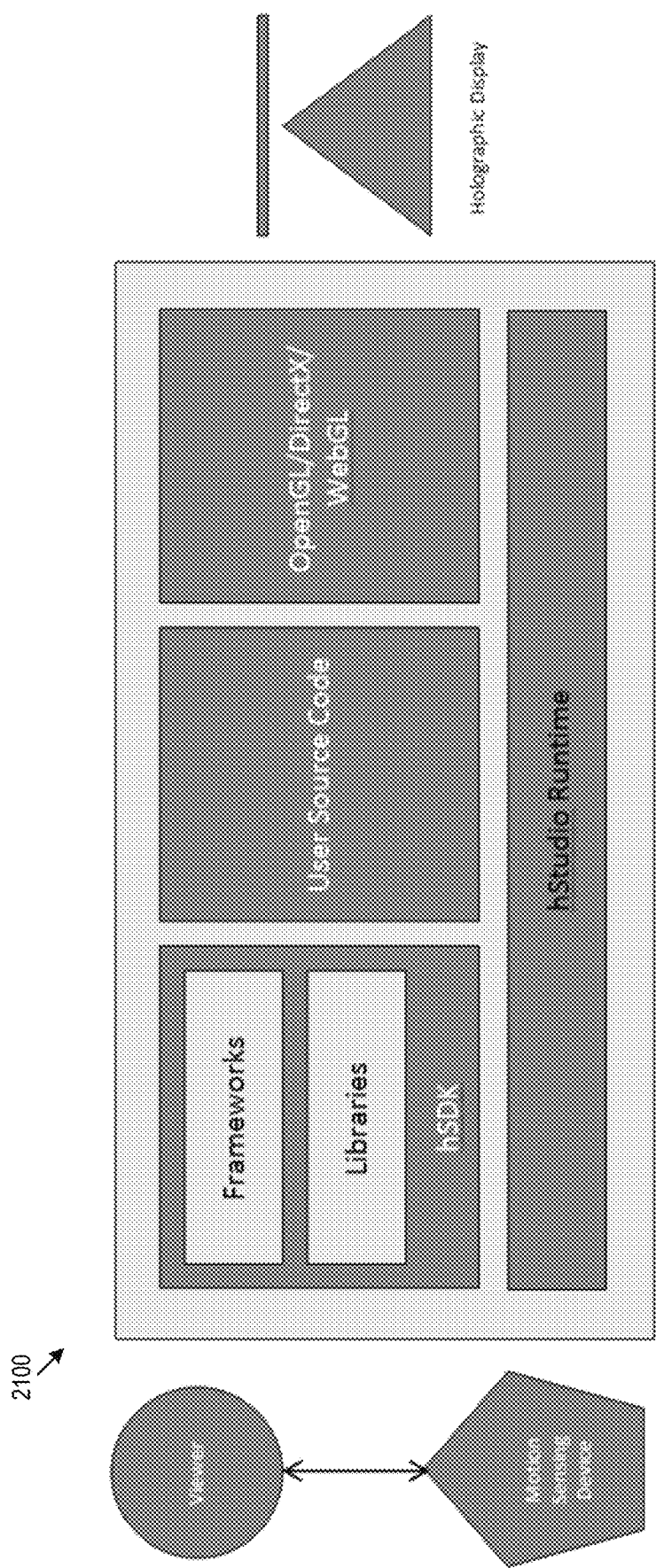
FIG. 20 shows example hStudio logic for hUI development.
Figure 21:
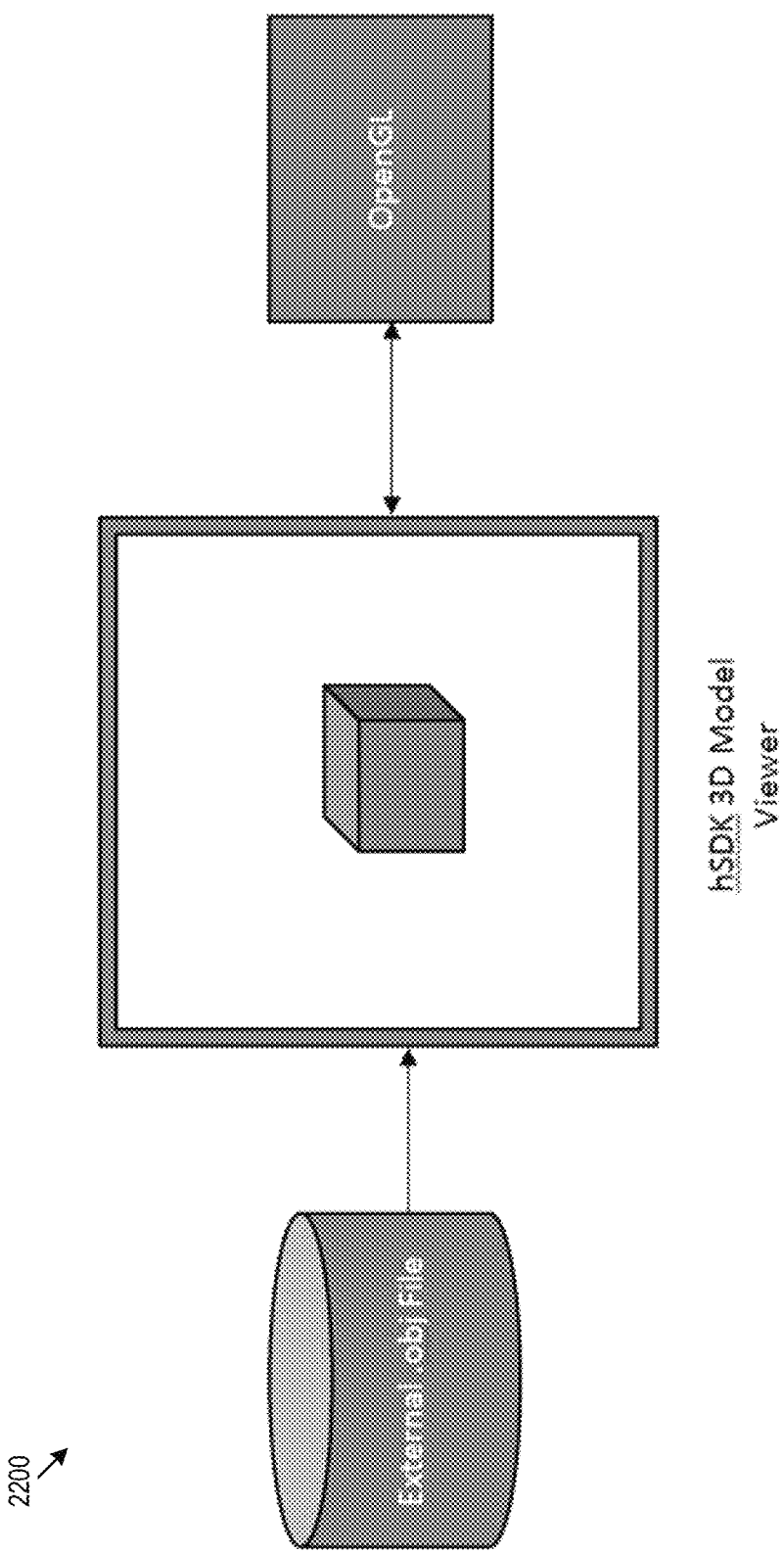
FIG. 21 shows example hSDK model viewer logic for interaction with .obj files and graphics tools.

FIG. 20 shows example hStudio logic 2100 for hUI development.

shown in the representation above, the hStudio runtime communicates with the underlying OpenGL/DirectX/WebGL system and uses hSDK frameworks and libraries to run the user source code. The hStudio tool would provide an integrated environment, which would allow the user to perform simple drag-and-drop in order to design a 3D app/presentation. Furthermore, the user would also be able to customize components through scripting. The scripting language would depend on the underlying graphics API (OpenGL/DirectX/WebGL) chosen while developing hStudio. The hStudio runtime also communicates with the motion-sensing device to interpret user gestures.

hSDK comprises of all the core frameworks and libraries which assist a developer in leveraging hUI to design and develop 3D apps/presentations for an interactive 3D holographic display system. hSDK includes of the following:

hSDK 3D Model Viewer—The hSDK 3D Model Viewer would allow the developer to view (zoom, pan, tumble), translate, scale and rotate any 3D model loaded from an external .obj file. A 3D element in hUI could be modeled using an external file, instead of manually specifying each and every vertex and polygon information. Under the hood, the hSDK 3D Model Viewer would exploit OpenGL to render the loaded 3D model. FIG. 21 shows example hSDK model viewer logic 2200 for interaction with .obj files and graphics tools.

hSDK Multimedia Viewer—The hSDK Multimedia Viewer would be able to load multimedia content for use within a 3D app/presentation. It would be able to load audio, video, images, documents and interactive content. The hSDK Multimedia Viewer would rely on the underlying native frameworks and libraries of the development machine to load and display multimedia content.

hSDK Scene Editor—The hSDK builds on top of the concepts of hUI. that hSDK provide a Scene Editor. The hSDK Scene Editor would allow the developer to view and edit a 3D Scene (and associated Scene Controller associations) by providing a GUI to do so. For more details on a hUI Scene and Scene Controller, please refer to the document describing the concepts of hUI in detail. Thus, the hSDK Scene Editor would allow the developer to:

View and edit hUI Scenes and Scene Controllers.
Individually select, translate, rotate and scale objects in a Scene.
Specify object attributes and associations by providing a GUI to do so (for more details on the possible object attributes and associations in hUI, please refer to the document describing the concepts of hUI in detail).
Allow simple drag and drop to edit objects (and their attributes and associations).

Attach Gesture Responders to objects using simple drag and drop.

Embed the hSDK 3D Model Viewer to allow the loading of 3D models from external files.

Figure 22:
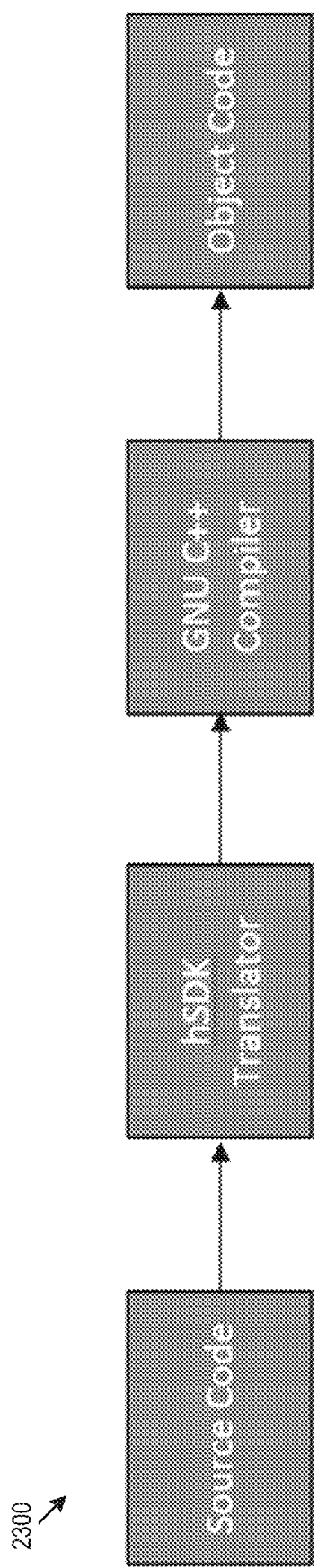
FIG. 22 show example translator logic for translating source code into object code.

Embed the hSDK Multimedia Viewer to allow the loading of multimedia content, viz., audio, video, images, documents and interactive content.

hSDK Translator—As we have already discussed that hStudio acts on top of the native OpenGL layer of the underlying development system. The source code for any 3D app/presentation and may be translated to C-based OpenGL calls. Thus, any 3D app/presentation in the hStudio environment, translates into C-based OpenGL calls. That is, in some instances, the source code (written in a high level language) may be translated into C++ code and given to the GNU C++ compiler to finally compile it into object code. FIG. 22 show example translator logic 2300 for translating source code into object code.

The source code is written in a high level language (preferably in the language used to develop hSDK itself). It is then provided to the hSDK Translator which translates the source code to C-based OpenGL calls. The result of this step is C++ code which is then provided to the GNU C++ Compiler. The GNU C++ Compiler then finally compiles it into object code.

hSDK Frameworks and Libraries—hSDK offers a wide range of off-the-shelf components to ease the development of any 3D app/presentation. The hSDK library comprises of all the base classes that constitute the hUI ecosystem. It also contains various utility classes for the ease of development. Apart from that, as described in the hUI detail document, hUI Widgets rely on the underlying native frameworks and libraries to offer a wide range of miscellaneous services (please refer to the hUI detail document).

The hStudio may runs on a parallel thread (whenever the 3D app/presentation is executed) and monitors and manages the following:

Manages the gesture interaction between the user and the current 3D Scene. It basically monitors the attached motion-sensing device (e.g., Leap Motion Sensor™ or Microsoft Kinect Controller™) for gesture events and sends them to the app as events for further processing.

Manages any network interactions required by the 3D app/presentation. It can make web service calls on behalf of the 3D app/presentation and return the response for further processing.

Manages system level interrupts and provides an abstraction layer that the 3D app/presentation can choose to use.

Figure 23:
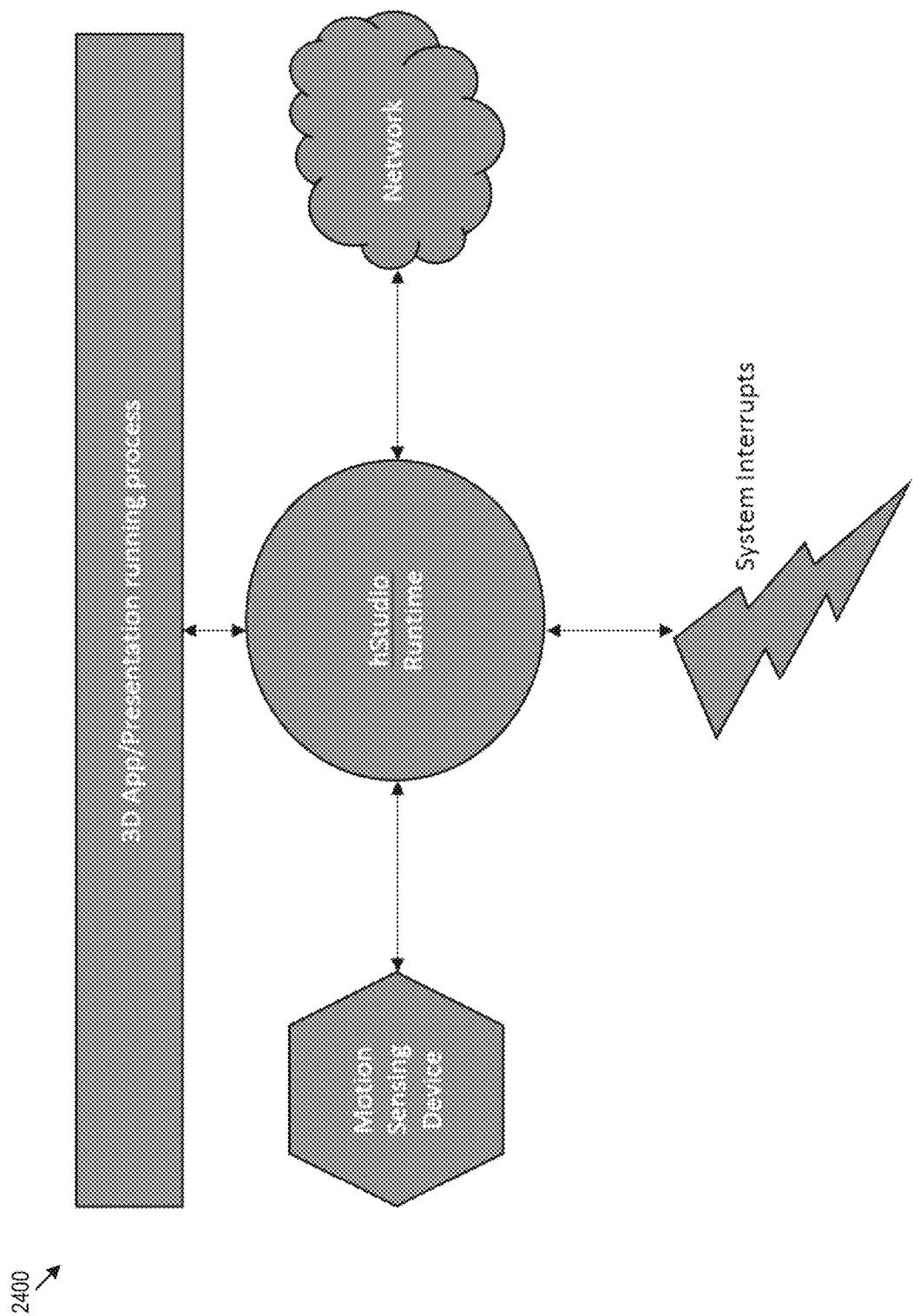
FIG. 23 shows example hStudio runtime logic.

Thus, the hStudio Runtime architecture can be summarized as shown below:

FIG. 23 shows example hStudio runtime logic 2400. The hStudio Runtime basically acts on behalf of the running 3D App/Presentation process. It abstracts out the complex details of, for example, making a network call and returning the response. It also abstracts out a wide range of System Interrupts. Thus, it makes it easier for the developer to decide how to react, when, for example, there is an operating system restart enforced. In addition to all this, in order for the hStudio Runtime to be able to track events coming from the attached Motion Sensing Device, it has to rely on the frameworks and libraries provided by the Motion Sensing Device manufacturer.

All the components described in the previous sections come together to make up what is called as the 'hStudio'. As described in the architectural depiction (in the introductory section), hStudio comprises of several components which form the hStudio ecosystem as a whole. hStudio is an IDE which eases the development process of a 3D app/presentation for an Interactive 3D Holographic Display System. hStudio has the following aspects:

Provides boiler plate code (termed as 'templates') which allows the user to get a base code to develop further on. There are several templates to choose from depending on the developer's needs and depending on the purpose of the 3D app/presentation. The available templates are:

Single Scene Template—This template contains a single Scene Controller which manages a simple Scene with a basic Cube object.

Navigable Scene Template—This template contains a NavigationSceneController managing a single Scene Controller (as the root node).

Bunch Scene Template—This template contains a BunchSceneController managing two simple Scene Controller objects.

Please note that hStudio may be extended to incorporate more templates if required.

Provides a GUI based interface to allow the developer to use drag and drop wherever possible to ease development. The hStudio GUI is laid out in 'sections'. These sections cater to a different purpose, but, complement each other in the process of development.

Figure 24:
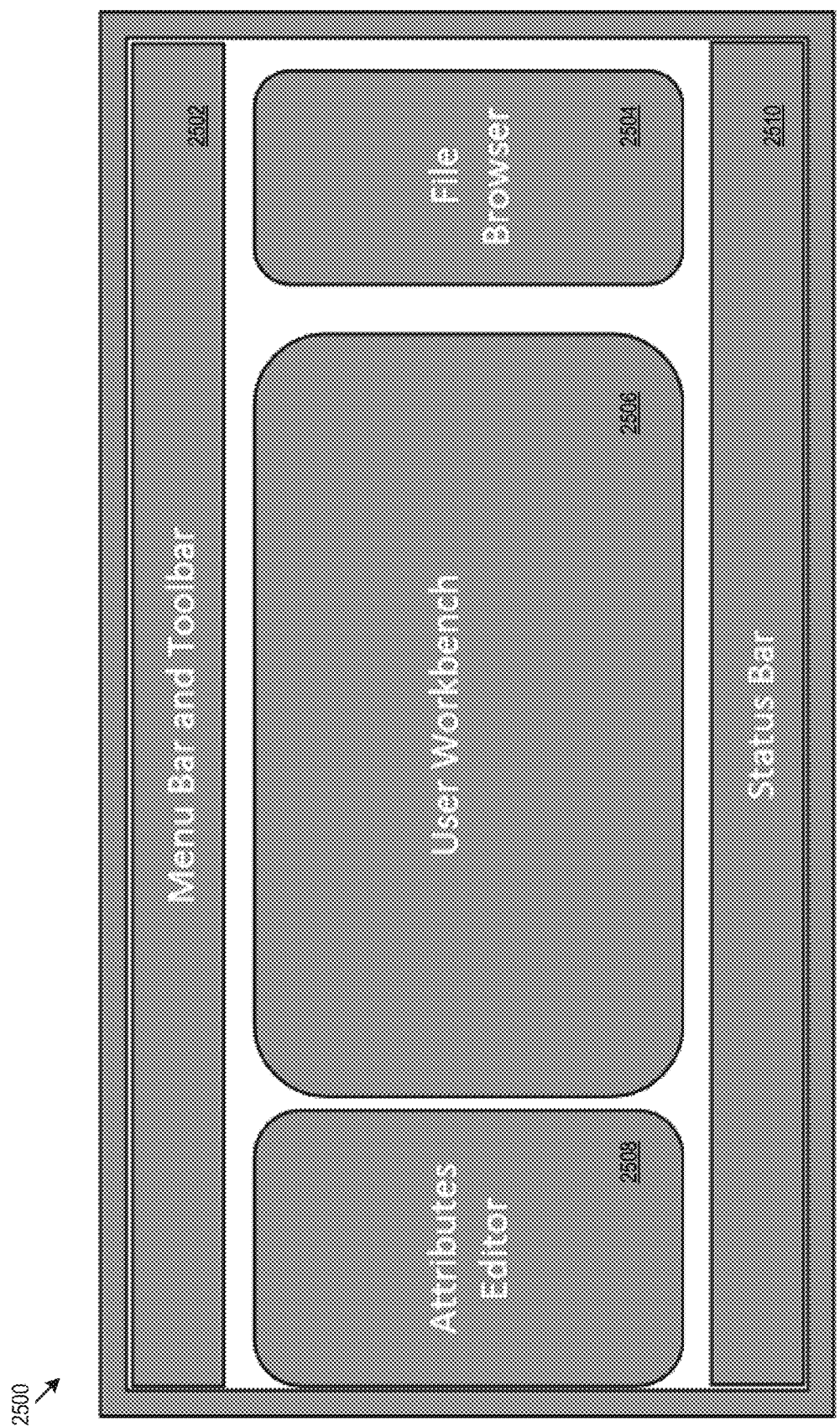
FIG. 24 shows an example hStudio interface.

FIG. 24 shows an example hStudio interface 2500. The Menu Bar 2502 contains menu items which allow the developer to perform actions on the project at hand:

The Toolbar contains tools and off-the-shelf components that can use/drag-and-drop to speed up the development process.

The File Browser 2504 displays project files (e.g., in the form of a project directory structure) and allows files to be moved between directories, allows files to be copied, pasted, renamed and deleted. Please note that the directory structure displayed in the File Browser corresponds to the actual directory structure in the underlying file system. This means that when the developer moves a file between two directories using the hStudio File Browser, the file is actually moved from one directory to another in the underlying file system.

The User Workbench 2506 is a context driven section which changes based on the selected resource. For example, if the developer selects a source code file, then a text editor is shown loaded with the selected file. If the developer selects a 3D model file (.obj file), then the hStudio 3D Model Viewer is shown with the 3D model loaded.

The Attributes Editor 2508 shows various attributes of a particular selected object in the User Workbench area. It also allows the developer to edit some of the attributes. For example, consider that a Scene is loaded (using the hStudio Scene Editor) in the User Workbench area. In such a scenario, if the developer were to select a 3D UI element in the Scene, the corresponding attributes of the selected 3D UI element would be displayed in the Attributes Editor.

The Status Bar 2510 displays various kinds of context based 'status' information. For example, while editing a source code file, the Status Bar displays the current line number, the current column number, and other context based status information.

Allows source code files to be organized into a manageable 'project'. The 'project' structure is specified in an XML file (with an extension '.hstudio'). This XML file is part of the project directory itself and lies in the root of the directory. The project can be loaded into hStudio by opening this XML file (for example, by double clicking the project XML file in the underlying OS file system).

Interacts with the hStudio Translator, the hStudio Runtime and the underlying OpenGL layer (of the host OS) to execute an hStudio 3D app/presentation.

What is claimed is:

1. A system comprising:
display controller circuitry configured to drive a holographic display to render a 3D interface object responsive to a scene state indicator;
processing circuitry in data communication with the display controller circuitry, the processing circuitry configured to implement closed-loop state control over the display controller circuitry by:
at a base class layer of an holographic interface stack executing on the processing circuitry, selecting a specific user-interface (UI) object class for the 3D interface object from among multiple UI object classes;
responsive to the specific UI object class:
generating, at a renderer layer of the holographic interface stack, a graphical state indicator for 3D interface object; and
determining to associate the 3D interface object with a selected object property from a group of properties including a transform property, a gesture response property, and a widget property;
when the selected object property includes the transform property:
requesting a transform attribute value from a shape descriptor layer of the holographic interface stack;
responsive to the transform attribute value, updating the graphical state indicator by performing a scaling operation, a rotation operation, a positioning operation, or any combination thereof on the 3D interface object at the renderer layer;
when the selected object property includes the gesture response property:
requesting, from a gesture responder layer of the holographic interface stack, a gesture indicator for the 3D interface object, the gesture indicator comprising:
an indication of a particular gesture for the 3D interface object, the particular gesture having a pre-programmed association to a particular shape of the 3D interface object; and
an indication of a preset response for the particular gesture;
when the selected object property includes the widget property:
associating an input channel, an output channel, or both with the 3D interface object;
updating, at the renderer layer, the graphical state indicator of the 3D interface object to include a graphical representation of the input channel, the output channel;
receiving, from the renderer layer, the graphical state indicator at a scene controller layer of the holographic interface stack;
responsive to the graphical state indicator, generating the scene state indicator responsive to a compiled holographic scene including the 3D interface object; and
sending the scene state indicator to the display controller circuitry.

2. The system of claim 1, where the input channel, the output channel, or both comprise an image channel, an audio channel, a text interface, or any combination thereof.

3. The system of claim 1, where processing circuitry is further configured to associate the input channel, the output channel, or both with a media control console renderable on the 3D interface object.

4. The system of claim 1, where the widget property further comprises an association with a memory access resource provided by a storage layer of the holographic interface stack.

5. The system of claim 1, where, responsive to the renderer layer performing the rotation operation, the processing circuitry is configured to change an activation orientation of the 3D interface object.

6. The system of claim 5, where the change to the activation orientation is configured to activate the widget property.

7. The system of claim 1, where the preset response is configured to alter the transform attribute value.

8. The system of claim 1, where the preset response comprises selection of one of multiple position-designated user input options.

9. The system of claim 1, where the holographic display comprises a 360 degree viewable angle range.

10. The system of claim 1, where the scene controller layer is configured to compile the compiled holographic scene by accessing a lighting tool from a graphics language layer of the holographic interface stack.

11. The system of claim 10, where the renderer layer is configured to generate the graphical state indicator for the 3D interface object by accessing a shader tool from the graphics language layer of the holographic interface stack.

12. The system of claim 1, where processing circuitry is configured to receive a designation of the selected object property from a holographic interface design application.

13. The system of claim 12, where the holographic interface design application comprises an application programming interface (API) associated with the holographic interface stack.

14. A method comprising:
at display controller circuitry, driving a holographic display to render a 3D interface object responsive to a scene state indicator;
at processing circuitry in data communication with the display controller circuitry, implementing closed-loop state control over the display controller circuitry by:
at a base class layer of an holographic interface stack executing on the processing circuitry, selecting a specific user-interface (UI) object class for the 3D interface object among multiple UI object classes;
responsive to the specific UI object class:
generating, at a renderer layer of the holographic interface stack, a graphical state indicator for 3D interface object; and
determining to associate the 3D interface object with a selected object property from a group of properties including a transform property, a gesture response property, and a widget property;
when the selected object property includes the transform property:
requesting a transform attribute value from a shape descriptor layer of the holographic interface stack;
responsive to the transform attribute, updating the graphical state indicator by performing a scaling operation, a rotation operation, a positioning operation, or any combination thereof on the 3D interface object at the renderer layer;
when the selected object property includes the gesture response property:

requesting, from a gesture responder layer of the holographic interface stack, a gesture indicator for the 3D interface object, the gesture indicator comprising:
an indication of a particular gesture for the 3D interface object, the particular gesture having a pre-programmed association to a particular shape of the 3D interface object; and
an indication of a preset response for the particular gesture;
when the selected object property includes the widget property:
associating an input channel, an output channel, or both with the 3D interface object;
updating, at the renderer layer, the graphical state indicator of the 3D interface object to include a graphical representation of the input channel, the output channel;
receiving, from the renderer layer, the graphical state indicator at a scene controller layer of the holographic interface stack;
responsive to the graphical state indicator, generating the scene state indicator responsive to a compiled holographic scene including the 3D interface object; and
sending the scene state indicator to the display controller circuitry.

15. The method of claim 14, where the input channel, the output channel, or both comprise an image channel, an audio channel, a text interface, or any combination thereof.

16. The method of claim 14, further comprising associating the input channel, the output channel, or both with a media control console renderable on the 3D interface object.

17. The method of claim 14, where the widget property further comprises an association with a memory access resource provided by a storage layer of the holographic interface stack.

18. A product comprising:
a machine-readable medium other than a transitory signal;
instructions stored on the machine-readable medium, the instructions configured to, when executed, cause processing circuitry to:
implement closed-loop state control over display controller circuitry configured to drive a holographic display to render a 3D interface object responsive to a scene state indicator by:
at a base class layer of an holographic interface stack executing on the processing circuitry, selecting a specific user-interface (UI) object class for the 3D interface object among multiple UI object classes;
responsive to the specific UI object class:
generating, at a renderer layer of the holographic interface stack, a graphical state indicator for 3D interface object; and
determining to associate the 3D interface object with a selected object property from a group of properties including a transform property, a gesture response property, and a widget property;
when the selected object property includes the transform property:
requesting a transform attribute value from a shape descriptor layer of the holographic interface stack;
responsive to the transform attribute, updating the graphical state indicator by performing a scaling operation, a rotation operation, a positioning operation, or any combination thereof on the 3D interface object at the renderer layer;
when the selected object property includes the gesture response property:
requesting, from a gesture responder layer of the holographic interface stack, a gesture indicator for the 3D interface object, the gesture indicator comprising:
an indication of a particular gesture for the 3D interface object, the particular gesture having a pre-programmed association to a particular shape of the 3D interface object; and
an indication of a preset response for the particular gesture;
when the selected object property includes the widget property:
associating an input channel, an output channel, or both with the 3D interface object;
updating, at the renderer layer, the graphical state indicator of the 3D interface object to include a graphical representation of the input channel, the output channel;
receiving, from the renderer layer, the graphical state indicator at a scene controller layer of the holographic interface stack;
responsive to the graphical state indicator, generating the scene state indicator responsive to a compiled holographic scene including the 3D interface object; and
sending the scene state indicator to the display controller circuitry.

19. The product of claim 18, where instructions are further configured to cause the processing circuitry to receive a designation of the selected property from a holographic interface design application.

20. The product of claim 19, where the holographic interface design application comprises an application programming interface (API) associated with the holographic interface stack.

* * * * *